United States Patent
Sato

(10) Patent No.: US 7,532,411 B2
(45) Date of Patent: *May 12, 2009

(54) HIGH ZOOM RATIO ZOOM LENS SYSTEM

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/957,471

(22) Filed: Dec. 16, 2007

(65) Prior Publication Data

US 2008/0100924 A1 May 1, 2008

Related U.S. Application Data

(63) Continuation of application No. 11/527,394, filed on Sep. 27, 2006, now Pat. No. 7,369,325.

(30) Foreign Application Priority Data

Sep. 28, 2005 (JP) .............................. 2005-282932
Aug. 29, 2006 (JP) .............................. 2006-232162

(51) Int. Cl.
*G02B 15/14* (2006.01)

(52) U.S. Cl. ...................... 359/686; 359/687; 359/691

(58) Field of Classification Search ................. 359/676, 359/686–692
See application file for complete search history.

(56) References Cited

U.S. PATENT DOCUMENTS

| | | | |
|---|---|---|---|
| 5,570,233 A | 10/1996 | Mihara et al. | |
| 5,712,733 A | 1/1998 | Mukaiya | |
| 6,556,356 B2 * | 4/2003 | Ohtake | 359/687 |
| 7,136,231 B2 | 11/2006 | Ito et al. | |
| 7,190,529 B2 | 3/2007 | Miyajima et al. | |
| 7,196,853 B2 * | 3/2007 | Nishio et al. | 359/690 |
| 7,369,325 B2 * | 5/2008 | Sato | 359/686 |
| 2002/0097503 A1 | 7/2002 | Kohno et al. | |

FOREIGN PATENT DOCUMENTS

| | | |
|---|---|---|
| JP | 7-20381 A | 1/1995 |
| JP | 8-201695 A | 8/1996 |
| JP | 10-39213 A | 2/1998 |

* cited by examiner

*Primary Examiner*—Darryl J Collins
(74) *Attorney, Agent, or Firm*—Miles & Stockbridge P.C.

(57) ABSTRACT

Providing a high zoom ratio zoom lens system having a short total lens length and a small diameter of the first group despite of securing excellent optical performance, a half angle of view of 3.5° or less in the telephoto end, an f-number of 6 or less in the telephoto end, and a zoom ratio of about 10 or more. The system is composed of a first group having positive power, a second group having negative power, a third group having positive power, and a fourth group having positive power. The first group is composed of, in order from the object, a negative meniscus lens having a convex surface facing the object, a first positive lens having a convex surface facing the object, and a second positive lens. All groups moves along the optical axis upon zooming from a wide-angle end to a telephoto end. Given conditions are satisfied.

27 Claims, 17 Drawing Sheets

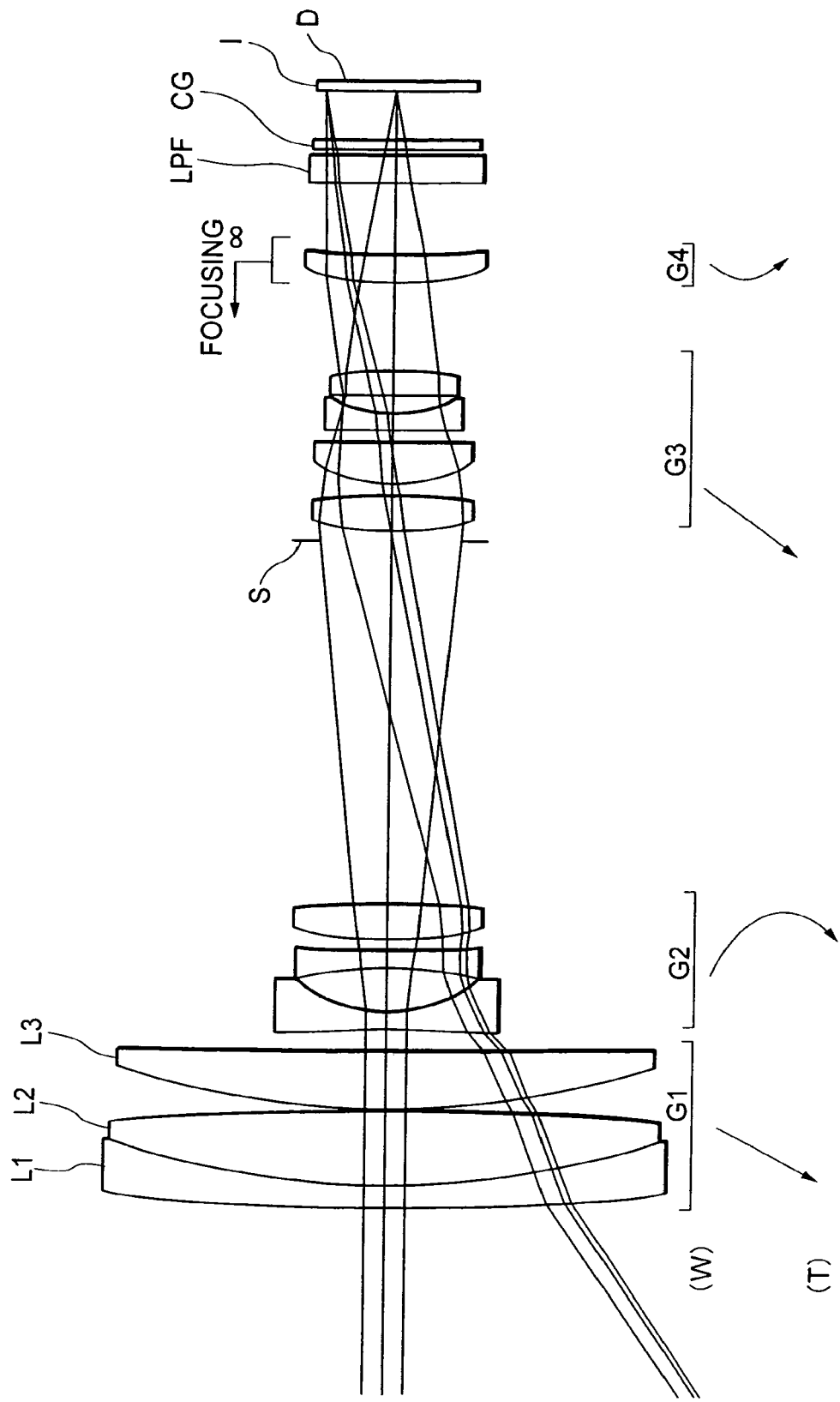

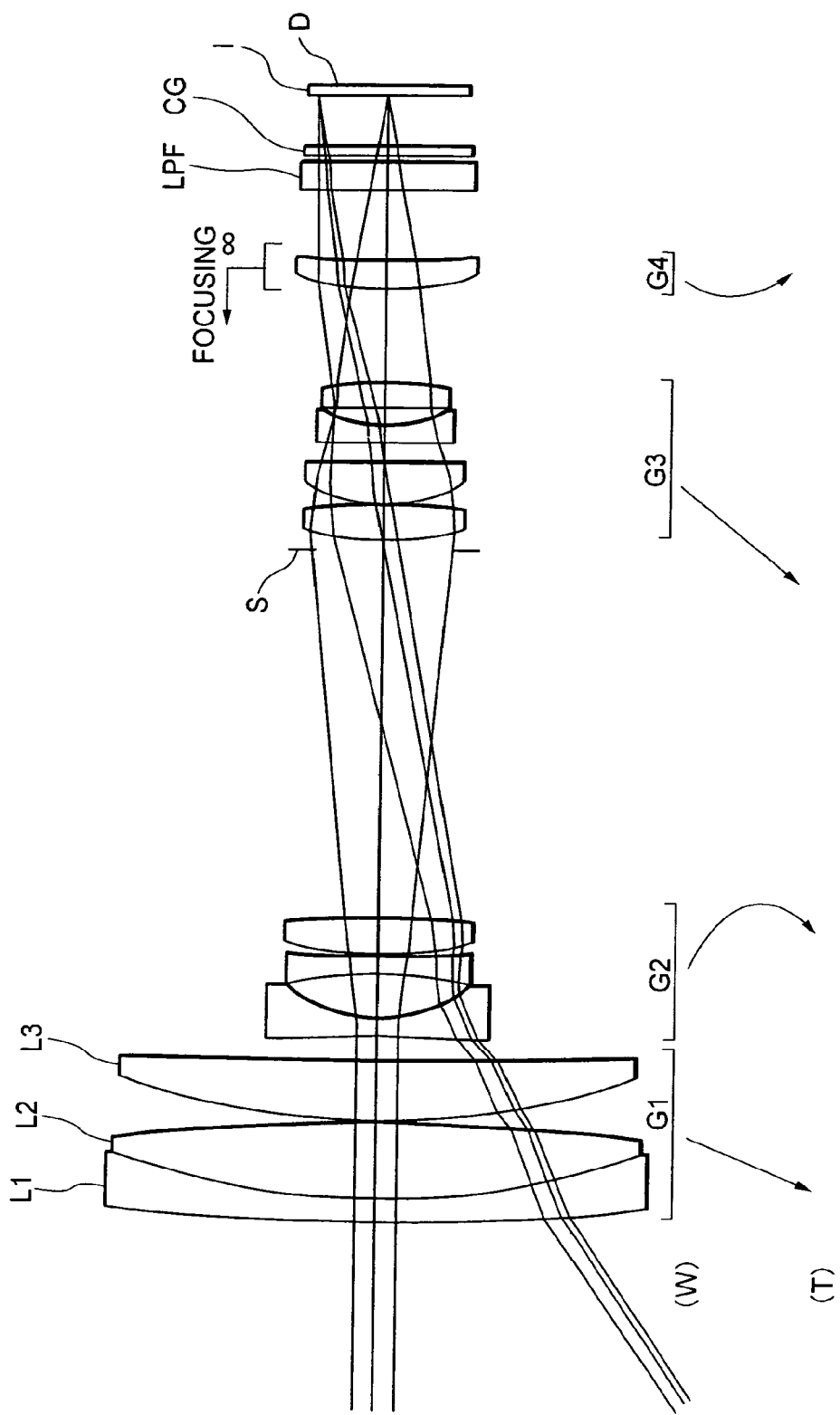

HIGH ZOOM RATIO ZOOM LENS SYSTEM

CROSS-REFERENCE TO RELATED APPLICATION

This application is a continuation of application Ser. No. 11/527,394 filed Sep. 27, 2006, now U.S. Pat. No. 7,369,325.

The disclosure of the following priority applications are herein incorporated by reference:

Japanese Patent Application No. 2005-282932 filed on Sep. 28, 2005, and

Japanese Patent Application No. 2006-232162 filed on Aug. 29, 2006.

BACKGROUND OF THE INVENTION

1. Field of the Invention

The present invention relates to a photographic high zoom ratio zoom lens system suitable for an electronic still camera and the like.

2. Related Background Art

In a photographic high zoom ratio zoom lens system suitable for an electronic still camera and the like, there have been known zoom lens systems carrying out zooming by moving all lens groups thereof, having a zoom ratio of about ten, disclosed in such as Japanese Patent Application Laid-Open No. 7-20381.

Moreover, there have been known high zoom ratio zoom lens systems, in which a first lens group is fixed upon carrying out zooming, and a zoom ratio thereof is extended about twelve to sixteen, disclosed in such as Japanese Patent Application Laid-Open No. 8-201695.

Furthermore, there have been known high zoom ratio zoom lens systems further extending a zoom ratio in consideration of the dimension of a first lens group, disclosed in such as Japanese Patent Application Laid-Open No. 10-39213.

However, in zoom lens systems disclosed in example 1 to 3 of Japanese Patent Application Laid-Open No. 7-20381, since a normalized total thickness along the optical axis of a first lens group is large, in other words, the total thickness of the first lens group normalized by an image height IH in a wide-angle end state is about 3.7, the weight of glass materials tends to become heavy. Accordingly, the weight of the optical system tends to increase, and mechanical decentering of the first lens group upon becoming the maximum total lens length, which is in the telephoto end state, also tends to increase, so that it is undesirable. Moreover, the maximum effective diameter of the first lens group is also large, which is about twelve upon being normalized by the image height IH in the wide-angle end state. In zoom lens systems disclosed in Example 4 and 5 of Japanese Patent Application Laid-Open No. 7-20381, although the normalized total thickness along the optical axis of the first lens group is about 2.14, and the maximum effective diameter is 6.7, which are relatively small, there is another problem that variation in spherical aberration upon zooming from the wide-angle end state to the telephoto end state becomes large.

In optical systems disclosed in Examples in Japanese Patent Application Laid-Open No. 8-201695, there is a problem that the dimension of the first lens group becomes large such that the normalized total thickness of the first lens group is from 2.75 to 4.23, and the maximum effective diameter is from 9.25 to 11.66.

In optical systems disclosed in Examples in Japanese Patent Application Laid-Open No. 10-39213, the first lens group is fixed upon zooming, the zoom ratio is about 14 to 20, and the dimension of the first lens group is taken into consideration. However, there is a problem that the dimension of the first lens group becomes large such that the normalized total thickness of the first lens group is from 3.66 to 4.42, and the maximum effective diameter is from 8.37 to 9.68.

SUMMARY OF THE INVENTION

The present invention is made in view of the aforementioned problems and has an object to provide a high zoom ratio zoom lens system having a short total lens length and a small effective diameter of the first lens group in spite of securing superb optical performance, having a half angle of view in the telephoto end state of 3.5 degrees or less, an f-number in the telephoto end state of six or less, and a zoom ratio of about 10 or more.

According to a first aspect of the present invention, there is provided a high zoom ratio zoom lens system including, in order from an object, a first lens group having positive refractive power, and a second lens group. The first lens group is composed of, in order from the object, a negative meniscus lens having a convex surface facing the object, a first positive lens having a convex surface facing the object, and a second positive lens. The first lens group and the second lens group are moved along the optical axis upon zooming from a wide-angle end state to a telephoto end state. The following conditional expression (1) is satisfied:

$$0.-<FG1\times(Nd1-Nd2)/FL3<0.75 \qquad (1)$$

where FG1 denotes a focal length of the first lens group, FL3 denotes a focal length of the second positive lens, Nd1 denotes refractive index of the negative meniscus lens at d-line (wavelength $\lambda=587.6$ nm), and Nd2 denotes refractive index of the first positive lens at d-line (wavelength $\lambda=587.6$ nm).

In the first aspect of the present invention, it is preferable that the zoom lens system further includes, in order from the object, a third lens group disposed to an image side of the second lens group, and a fourth lens group.

In the first aspect of the present invention, it is preferable that the second lens group has negative refractive power, the third lens group has positive refractive power, and the fourth lens group has positive refractive power.

In the first aspect of the present invention, it is preferable that when zooming from the wide-angle end state to the telephoto end state, the first lens group is moved to the object, the second lens group is moved along a zooming trajectory having a concave shape facing the object, the third lens group is moved to the object, and the fourth lens group is moved along a zooming trajectory having a convex shape facing the object.

In the first aspect of the present invention, the following conditional expressions (2) and (3) are preferably satisfied:

$$-0.15<FG1/FL12<0.25 \qquad (2)$$

$$0.4<FG1/(FL3\times Nd3)<0.6 \qquad (3)$$

where FL12 denotes a combined focal length of the negative meniscus lens and the first positive lens in the first lens group, and Nd3 denotes refractive index of the second positive lens in the first lens group at d-line (wavelength $\lambda=587.6$ nm).

In the first aspect of the present invention, the following conditional expression (4) is preferably satisfied:

$$-0.0001<Fw/(Ft\times FL12)<0.0005 \qquad (4)$$

(unit: 1/mm)

where Ft denotes a focal length of the zoom lens system in the telephoto end state, Fw denotes a focal length of the zoom lens system in the wide-angle end state, and FL12 denotes a combined focal length of the negative meniscus lens and the first positive lens in the first lens group.

In the first aspect of the present invention, it is preferable that an aspherical surface is included in the second lens group, and an aspherical surface is included in the third lens group.

In the first aspect of the present invention, it is preferable that the fourth lens group is moved along the optical axis upon varying a focus from an object at infinity to a close object.

In the first aspect of the present invention, it is preferable that an image blur is corrected by moving the third lens group perpendicularly to the optical axis.

In the first aspect of the present invention, it is preferable that the negative meniscus lens and the first positive lens are cemented with each other.

According to a second aspect of the present invention, there is provided a method for forming an image of an object and varying a focal length of a high zoom ratio zoom lens system that includes, in order from the object, a first lens group having positive refractive power, and a second lens group, comprising steps of constructing the first lens group with, in order from the object, a negative meniscus lens having a convex surface facing the object, a first positive lens having a convex surface facing the object, and a second positive lens, varying the focal length by moving the first lens group and the second lens group along the optical axis when the zoom lens system moves from a wide-angle end state to a telephoto end state, and satisfying the following conditional expression (1):

$$0.31 < FG1 \times (Nd1-Nd2)/FL3 < 0.75 \quad (1)$$

where FG1 denotes a focal length of the first lens group, FL3 denotes a focal length of the second positive lens, Nd1 denotes refractive index of the negative meniscus lens at d-line (wavelength $\lambda$=587.6 nm), and Nd2 denotes refractive index of the first positive lens at d-line (wavelength $\lambda$=587.6 nm).

In the second aspect of the present invention, it is preferable that the method further includes a step of providing the high zoom ratio zoom lens system with, in order from the object, a third lens group disposed to an image side of the second lens group, and a fourth lens group.

In the second aspect of the present invention, it is preferable that the method further includes a step of providing the high zoom ratio zoom lens system with, in order from the object, the second lens group having negative refractive power, the third lens group having positive refractive power, and the fourth lens group having positive refractive power.

Other features and advantages according to the present invention will be readily understood from the detailed description of the most preferred embodiments in conjunction with the accompanying drawings.

BRIEF DESCRIPTION OF THE DRAWINGS

FIGS. 2A, 2B, and 2C are graphs showing various aberrations of the high zoom ratio zoom lens system according to Example 1 focusing on infinity in which FIG. 2A shows various aberrations in the wide-angle end state, FIG. 2B shows various aberrations in an intermediate focal length state, and FIG. 2C shows various aberrations in a telephoto end state.

FIGS. 3A, 3B, and 3C are graphs showing coma of the high zoom ratio zoom lens system according to Example 1 focusing on infinity upon carrying out vibration reduction in which FIG. 3A shows coma in the wide-angle end state, FIG. 3B shows coma in the intermediate focal length state, and FIG. 3C shows coma in the telephoto end state.

FIGS. 4A, 4B, and 4C are graphs showing various aberrations of the high zoom ratio zoom lens system according to Example 1 focusing on a close object in which FIG. 4A shows various aberrations in the wide-angle end state (Rw=300 mm), FIG. 4B shows various aberrations in the intermediate focal length state (Rm=300 mm), and FIG. 4C shows various aberrations in the telephoto end state (Rt=1000 mm).

FIGS. 5A, 5B, and 5C are graphs showing coma of the high zoom ratio zoom lens system according to Example 1 focusing on a close object upon carrying out vibration reduction in which FIG. 5A shows coma in the wide-angle end state (Rw=300 mm), FIG. 5B shows coma in the intermediate focal length state (Rm=300 mm), and FIG. 5C shows coma in the telephoto end state (Rt=1000 mm).

FIGS. 7A, 7B, and 7C are graphs showing various aberrations of the high zoom ratio zoom lens system according to Example 2 focusing on infinity in which FIG. 7A shows various aberrations in the wide-angle end state, FIG. 7B shows various aberrations in an intermediate focal length state, and FIG. 7C shows various aberrations in a telephoto end state.

FIGS. 8A, 8B, and 8C are graphs showing various aberrations of the high zoom ratio zoom lens system according to Example 2 focusing on a close object in which FIG. 8A shows various aberrations in the wide-angle end state (Rw=300 mm), FIG. 8B shows various aberrations in the intermediate focal length state (Rm=300 mm), and FIG. 8C shows various aberrations in the telephoto end state (Rt=1000 mm).

FIG. 9 is a diagram showing a lens configuration of a high zoom ratio zoom lens system according to Example 3 and positions of respective lens groups in a wide-angle end state W upon focusing on infinity.

FIGS. 10A, 10B, and 10C are graphs showing various aberrations of the high zoom ratio zoom lens system according to Example 3 focusing on infinity in which FIG. 10A shows various aberrations in the wide-angle end state, FIG. 10B shows various aberrations in an intermediate focal length state, and FIG. 10C shows various aberrations in a telephoto end state.

FIGS. 11A, 11B, and 11C are graphs showing various aberrations of the high zoom ratio zoom lens system according to Example 3 focusing on a close object in which FIG. 11A shows various aberrations in the wide-angle end state (Rw=300 mm), FIG. 11B shows various aberrations in the intermediate focal length state (Rm=300 mm), and FIG. 11C shows various aberrations in the telephoto end state (Rt=1000 mm).

FIG. 12 is a diagram showing a lens configuration of a high zoom ratio zoom lens system according to Example 4 and positions of respective lens groups in a wide-angle end state W upon focusing on infinity.

FIGS. 13A, 13B, and 13C are graphs showing various aberrations of the high zoom ratio zoom lens system according to Example 4 focusing on infinity in which FIG. 13A shows various aberrations in the wide-angle end state, FIG. 13B shows various aberrations in an intermediate focal length state, and FIG. 13C shows various aberrations in a telephoto end state.

FIGS. 14A, 14B, and 14C are graphs showing various aberrations of the high zoom ratio zoom lens system according to Example 4 focusing on a close object in which FIG. 14A shows various aberrations in the wide-angle end state (Rw=300 mm), FIG. 14B shows various aberrations in the intermediate focal length state (Rm=300 mm), and FIG. 14C shows various aberrations in the telephoto end state (Rt=1000 mm).

FIGS. 16A, 16B, and 16C are graphs showing various aberrations of the high zoom ratio zoom lens system according to Example 5 focusing on infinity in which FIG. 16A shows various aberrations in the wide-angle end state, FIG. 16B shows various aberrations in an intermediate focal length state, and FIG. 16C shows various aberrations in a telephoto end state.

FIGS. 17A, 17B, and 17C are graphs showing various aberrations of the high zoom ratio zoom lens system according to Example 5 focusing on a close object in which FIG. 17A shows various aberrations in the wide-angle end state (Rw=300 mm), FIG. 17B shows various aberrations in the intermediate focal length state (Rm=300 mm), and FIG. 17C shows various aberrations in the telephoto end state (Rt=1000 mm).

DESCRIPTION OF THE MOST PREFERRED EMBODIMENTS

Figure 1:
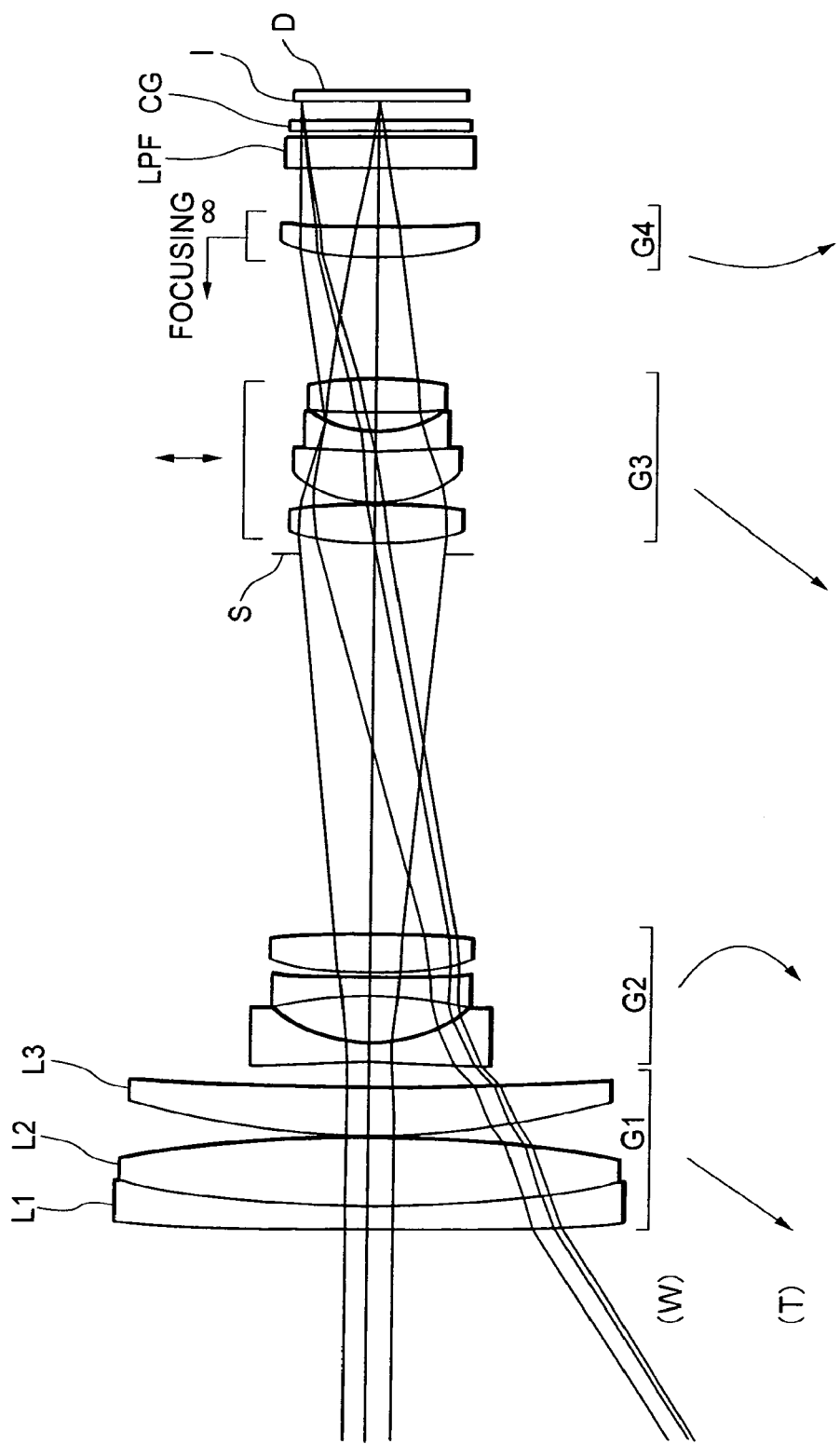
FIG. 1 is a diagram showing a lens configuration of a high zoom ratio zoom lens system according to Example 1 and positions of respective lens groups in a wide-angle end state W upon focusing on infinity.

Embodiments according to the present application will be explained below.

A high zoom ratio zoom lens system according to each Example of the present application is composed of, in order from an object, a first lens group having positive refractive power, a second lens group having negative refractive power, a third lens group having positive refractive power, and a fourth lens group having positive refractive power. The first lens group is composed of, in order from the object, a negative meniscus lens having a convex surface facing the object, a first positive lens having a convex surface facing the object, and a second positive lens. All lens groups are moved along the optical axis upon zooming from a wide-angle end state to a telephoto end state. The following conditional expression (1) is preferably satisfied:

$$0.31 < FG1 \times (Nd1 - Nd2)/FL3 < 0.75 \qquad (1)$$

where FG1 denotes a focal length of the first lens group, FL3 denotes a focal length of the second positive lens, Nd1 denotes refractive index of the negative meniscus lens at d-line (wavelength λ=587.6 nm), and Nd2 denotes refractive index of the first positive lens at d-line (wavelength λ=587.6 nm).

Conditional expression (1) is for suppressing the total length of the negative meniscus lens and the first positive lens having a convex surface facing the object in the first lens group and securing a good aberration state.

When the value FG1×(Nd1−Nd2)/FL3 is equal to or falls below the lower limit of conditional expression (1), difference in refractive index between the negative meniscus lens and the first positive lens having a convex surface facing the object in the first lens group becomes small. Accordingly, in order to suppress variation in spherical aberration upon zooming by means of maintaining proper combined negative power between the image side surface of the negative meniscus lens and the object side surface of the first positive lens, the radius of curvature have to be made small. As a result, the thickness along the optical axis of the glass material of the negative meniscus lens becomes large, so that it is undesirable. In other words, when the thickness along the optical axis of the glass material of the negative meniscus lens is made small while the value FG1×(Nd1−Nd2)/FL3 is equal to or falls below the lower limit of conditional expression (1), variation in spherical aberration upon zooming becomes large.

On the other hand, when the value FG1×(Nd1−Nd2)/FL3 is equal to or exceeds the upper limit of conditional expression (1), Petzval sum becomes large in the negative direction, and the image plane significantly curves in the positive direction, so that it is undesirable.

In order to secure the effect of the present embodiment, it is preferable to set the upper limit of conditional expression (1) to 0.65. In order to secure the effect of the present embodiment, it is preferable to set the lower limit of conditional expression (1) to 0.34.

In order to make the total length small upon retracting the lens barrel in spite of being a high zoom ratio zoom lens system, the first lens group preferably moves to the object upon zooming from the wide-angle end state to the telephoto end state upon focusing on infinity. With this construction, the total length upon retracting, which is smaller than the total lens length in the wide-angle end state, can be accomplished with a simple mechanism.

In order to carry out zooming effectively, it is preferable that when zooming from the wide-angle end state to the telephoto end state, the second lens group moves along a zooming trajectory concave to the object, and the third lens group moves to the object. With this construction, a space required for the second lens group upon zooming can be made small, so that a space for the third lens group moving to the object upon zooming can be secured.

It is preferable that the fourth lens group moves along a zooming trajectory convex to the object upon zooming from the wide-angle end state to the telephoto end state. With this construction, it becomes possible to correct variation in the image plane.

In the high zoom ratio zoom lens system according to the embodiment, in order to make the lens system to be wide-angle and to secure good aberration balance with keeping a distance between the first lens group and the second lens group, the following conditional expressions (2) and (3) are preferably satisfied:

$$-0.15 < FG1/FL12 < 0.25 \qquad (2)$$

$$0.4 < FG1/(FL3 \times Nd3) < 0.6 \qquad (3)$$

where FL12 denotes a combined focal length of the negative meniscus lens and the first positive lens in the first lens group, and Nd3 denotes refractive index of the second positive lens in the first lens group at d-line (wavelength λ=587.6 nm).

When the ratio FG1/FL12 is equal to or falls below the lower limit of conditional expression (2), variation in spherical aberration upon zooming becomes large, so that it is undesirable. On the other hand, when the ratio FG1/FL12 is equal to or exceeds the upper limit of conditional expression (2), a secondary principal point of the first lens group significantly comes into object side of the most image side lens surface of the first lens group, so that a distance between the first lens group and the second lens group cannot be secured, so it is undesirable. In other words, when a secondary principal point of the first lens group does not significantly come into object side of the most image side lens surface of the first lens group, spherical aberration in the telephoto end state becomes worse, so that it is undesirable.

In order to secure the effect of the present embodiment, it is preferable to set the upper limit of conditional expression (2) to 0.2. In order to secure the effect of the present embodiment, it is preferable to set the lower limit of conditional expression (2) to −0.1.

When the ratio FG1/(FL3×Nd3) is equal to or falls below the lower limit of conditional expression (3), a secondary principal point of the first lens group significantly comes into object side of the most image side lens surface of the first lens group, so that a distance between the first lens group and the second lens group cannot be secured, so it is undesirable. In other words, when a secondary principal point of the first lens group does not significantly come into object side of the most image side lens surface of the first lens group, spherical aberration in the telephoto end state becomes worse, so that it is undesirable.

On the other hand, when the ratio FG1/(FL3×Nd3) is equal to or exceeds the upper limit of conditional expression (3), the image plane significantly curves in the negative direction, so that it is undesirable.

In order to secure the effect of the present embodiment, it is preferable to set the upper limit of conditional expression (3) to 0.56. In order to secure the effect of the present embodiment, it is preferable to set the lower limit of conditional expression (3) to 0.45.

In the high zoom ratio zoom lens system according to each embodiment, the negative meniscus lens and the first positive lens in the first lens group preferably satisfy the following conditional expression (4):

$$-0.001 < Fw/(Ft \times FL12) < 0.0005 \quad (4)$$

where Ft denotes a focal length of the high zoom ratio zoom lens system in the telephoto end state, and Fw denotes a focal length of the high zoom ratio zoom lens system in the wide-angle end state. The unit of conditional expression (4) is 1/mm.

When the ratio Fw/(Ft×FL12) is equal to or falls below the lower limit of conditional expression (4), variation in spherical aberration upon zooming becomes large, so that it is undesirable. On the other hand, when the ratio Fw/(Ft×FL12) is equal to or exceeds the upper limit of conditional expression (4), a secondary principal point of the first lens group significantly comes into object side of the most image side lens surface of the first lens group, so that a distance between the first lens group and the second lens group cannot be secured, so it is undesirable. In other words, when a secondary principal point of the first lens group does not significantly come into object side of the most image side lens surface of the first lens group, spherical aberration in the telephoto end state becomes worse, so that it is undesirable.

In order to secure the effect of the present embodiment, it is preferable to set the upper limit of conditional expression (4) to 0.0004. In order to secure the effect of the present embodiment, it is preferable to set the lower limit of conditional expression (3) to −0.0005.

In the high zoom ratio zoom lens system according to the embodiment, in order to obtain good optical performance, when an aspherical surface is introduced in the second lens group, correction of curvature of field in the wide-angle end state becomes excellent. Moreover, when an aspherical surface is introduced in the third lens group, correction of spherical aberration in the telephoto end state becomes excellent.

In the high zoom ratio zoom lens system according to the embodiment, when the fourth lens group is made to be movable along the optical axis upon varying a focus from an object at infinity to a close object, focusing mechanism can be integrated in the vicinity of the camera body, so that it is preferable.

In the high zoom ratio zoom lens system according to the embodiment, since correction of an image blur is carried out by moving the third lens group perpendicularly to the optical axis, the mechanism for the correction can be independent from that for focusing, and the third lens group is the very portion where the outer diameter of the optical system becomes small, so that it is preferable. Correction of an image blur can also be carried out by moving a lens group other than the third lens group perpendicularly to the optical axis. Moreover, correction of an image blur can also be carried out by moving a portion of the third lens group perpendicularly to the optical axis.

In the high zoom ratio zoom lens system according to the embodiment, it is preferable that the negative meniscus lens and the first positive lens in the first lens group are cemented with each other. Upon assembling the zoom lens system, when the negative meniscus lens and the first positive lens in the first lens group are cemented with each other, it becomes unnecessary to adjust decentering between the negative meniscus lens and the first positive lens upon assembling into the lens barrel.

Each example of the high zoom ratio zoom lens system according to the embodiment is explained below with reference to accompanying drawings.

In each example, the high zoom ratio zoom lens system according to the embodiment is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state W and the telephoto end state T, the first lens group G1 is moved to the object, the second lens group G2 is moved along a zoom trajectory having concave shape facing the object, the third lens group G3 is moved to the object, and the fourth lens group G4 is moved along a zoom trajectory having convex shape facing the object.

An aperture stop S is moved together with the third lens group G3 upon zooming from the wide-angle end state W to the telephoto end state T.

An optical low-pass filter LPF and a cover glass CG for a solid-state imaging device D are disposed between the fourth lens group G4 and the image plane I, and the image plane I coincides with an imaging surface of the solid-state imaging device D.

The first lens group G1 is composed of, in order from the object, a negative meniscus lens L1 having a convex surface facing the object, a first positive lens L2 having a convex surface facing the object, and a second positive lens L3.

The image side surface of the negative lens disposed to the most object side of the second lens group G2 and the object side surface of the most object side positive lens of the third lens group G3 are aspherical surfaces.

The fourth lens group G4 is moved along the optical axis upon varying a focus from an object at infinity to a close object.

The diagonal length IH from the center of the solid-state imaging device D according to each Example is 3.75 mm.

In each example, an aspherical surface is exhibited by the following expression:

$$X=(y^2/r)/\{1+(1-\kappa\times y^2/r^2)^{1/2}\}+C4\times y^4+C6\times y^6+C8\times y^8$$

where y denotes a height from the optical axis, X denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), K denotes a conical coefficient, and C4, C6, and C8 denote aspherical coefficient of 4th order, 6th order, and 8th order, respectively. The position of an aspherical surface is expressed by attaching "*" to the left side of the surface number in [Lens Data].

Example 1

FIG. 1 is a diagram showing a lens configuration of a high zoom ratio zoom lens system according to Example 1 of the present application and positions of respective lens groups in a wide-angle end state W upon focusing on infinity.

In FIG. 1, the high zoom ratio zoom lens system according Example 1 is composed of, in order from the object, a first lens group G1 having positive refractive power, a second lens group G2 having negative refractive power, an aperture stop S, a third lens group G3 having positive refractive power, a fourth lens group G4 having positive refractive power, an optical low-pass filter LPF, and a cover glass CG for a solid-state imaging device D.

The first lens group G1 is composed of, in order from the object, a cemented positive lens constructed by a negative meniscus lens L1 having a convex surface facing the object cemented with a double convex positive lens L2, and a positive meniscus lens L3 having a convex surface facing the object.

The second lens group G2 is composed of, in order from the object, a double concave negative lens having an aspherical surface facing the image, a double concave negative lens, and a double convex positive lens.

The third lens group G3 is composed of, in order from the object, a double convex positive lens having an aspherical surface facing the object, a cemented negative lens constructed by a positive meniscus lens having a convex surface facing the object cemented with a negative meniscus lens having a convex surface facing the object, and a double convex positive lens.

The fourth lens group G4 is composed of a positive meniscus lens having a convex surface facing the object.

An image blur is corrected by moving the third lens group G3 perpendicularly to the optical axis.

The aperture stop S is moved along the optical axis together with the third lens group G3 on the same zoom trajectory upon zooming, and fixed upon correcting an image blur. Such configuration is used in the other Examples, and duplicated explanations are omitted.

Various values of the zoom lens system according to Example 1 are listed in Table 1.

In [Specifications], f denotes the focal length, and FNO denotes the f-number.

In [Lens Data], the left most column shows the lens surface number counted in order from the object side, the second column "r" shows a radius of curvature of the lens surface, the third column "d" shows a distance to the next lens surface, the fourth column "v" shows Abbe number of a medium at d-line (wavelength λ=587.6 nm), the fifth column "nd" shows refractive index of the medium at d-line (wavelength λ=587.6 nm), Bf denotes a back focal length, and Φ1 denotes an object side effective diameter of the negative meniscus lens L1 having a convex surface facing the object. In [Lens Data], r=∞ denotes a plane surface, and refractive index of the air n=1.000000 is omitted. In [Aspherical Data], "k" denotes a conical coefficient, and "Ci" denotes an i-th order aspherical coefficient. "E-n" means "$10^{-n}$". In [Variable Distances], W denotes a wide-angle end state, M denotes an intermediate focal length state, T denotes a telephoto end state, f denotes the focal length, β denotes shooting magnification, Bf denotes a back focal length, and D0 denotes a shooting distance along the optical axis between the object and the object side surface of the negative meniscus lens L1 in the first lens group G1.

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used. The explanation of reference symbols is the same in the other examples, so that duplicated explanations are omitted.

TABLE 1

[Specifications]

| | W | T |
|---|---|---|
| f = | 6.78 | 64.00 |
| FNO = | 2.8 | 4.8 |

[Lens Data]

| | r | d | ν | nd | |
|---|---|---|---|---|---|
| 1) | 149.3765 | 1.2000 | 25.46 | 2.000690 | Φ1 = 24.0 |
| 2) | 51.9182 | 3.6000 | 82.56 | 1.497820 | |
| 3) | −76.5680 | 0.1000 | | | |
| 4) | 35.0375 | 2.5000 | 45.30 | 1.795000 | |
| 5) | 109.5761 | (d5) | | | |
| 6) | −176.8587 | 1.0000 | 46.83 | 1.766840 | |
| *7) | 6.7898 | 2.5000 | | | |
| 8) | −21.5979 | 1.0000 | 46.63 | 1.816000 | |
| 9) | 55.7776 | 0.3000 | | | |
| 10) | 16.1058 | 2.0000 | 22.76 | 1.808095 | |
| 11) | −92.6325 | (d11) | | | |
| 12> | ∞ | 0.5000 | Aperture Stop S | | |
| *13) | 12.3441 | 2.1000 | 59.56 | 1.583130 | |
| 14) | −27.6923 | 0.1000 | | | |
| 15) | 5.7682 | 2.8000 | 82.56 | 1.497820 | |
| 16) | 33.7455 | 1.0000 | 32.35 | 1.850260 | |
| 17) | 4.9538 | 1.1000 | | | |
| 18) | 111.7796 | 1.7000 | 82.56 | 1.497820 | |
| 19) | −19.4238 | (d19) | | | |
| 20) | 11.9959 | 1.7000 | 82.56 | 1.497820 | |
| 21) | 37.1807 | (d21) | | | |
| 22) | ∞ | 1.6500 | 64.14 | 1.516330 | |
| 23) | ∞ | 0.4000 | | | |
| 24) | ∞ | 0.5000 | 64.14 | 1.516330 | |
| 25) | ∞ | (Bf) | | | |

[Aspherical Data]

Surface Number 7

κ = 0.8337
C4 = 0.00000E+00
C6 = 9.29050E−07
C8 = −4.83740E−08

Surface Number 13

κ = −0.9190
C4 = 0.00000E+00
C6 = −3.92890E−07
C8 = 0.00000E+00

TABLE 1-continued

|  | W | M | T |
|---|---|---|---|
| [Variable Distances] | | | |
| <Focusing on infinity> | | | |
| f = | 6.78000 | 32.00000 | 64.00000 |
| D0 = | ∞ | ∞ | ∞ |
| d5 = | 1.36890 | 25.19752 | 29.72851 |
| d11 = | 20.74526 | 5.28680 | 0.82362 |
| d19 = | 6.56962 | 10.33615 | 21.76115 |
| d21 = | 3.10000 | 6.59899 | 2.39239 |
| Bf = | 1.07320 | 1.07320 | 1.07320 |
| TL = | 60.60698 | 76.24265 | 83.52887 |
| <Focusing on a close object> | | | |
| β = | −0.02654 | −0.10371 | −0.05646 |
| D0 = | 239.3931 | 223.7574 | 916.4711 |
| d5 = | 1.36890 | 25.19752 | 29.72851 |
| d11 = | 20.74526 | 5.28680 | 0.82362 |
| d19 = | 6.12046 | 5.14202 | 14.79523 |
| d21 = | 3.54915 | 11.79311 | 9.35831 |
| Bf = | 1.07320 | 1.07320 | 1.07320 |
| TL = | 60.60698 | 76.24265 | 83.52887 |
| [Shift amount of VR lens group upon VR] | | | |
| <Focusing on infinity> | | | |
| f = | 6.78000 | 32.00000 | 64.00000 |
| shift amount | ±0.027 | ±0.104 | ±0.159 |
| <Focusing on a close object> | | | |
| β = | −0.02654 | −0.10371 | −0.05646 |
| shift amount | ±0.027 | ±0.104 | ±0.159 |
| [Values for Conditional Expressions] | | | |
| (1): FG1 × (Nd1 − Nd2)/FL3 = 0.408 | | | |
| (2): FG1/FL12 = 0.185 | | | |
| (3): FG1/(FL3 × Nd3) = 0.452 | | | |
| (4): Fw/(Ft × FL12) = 0.00038 (unit: 1/mm) | | | |

Figure 2A:
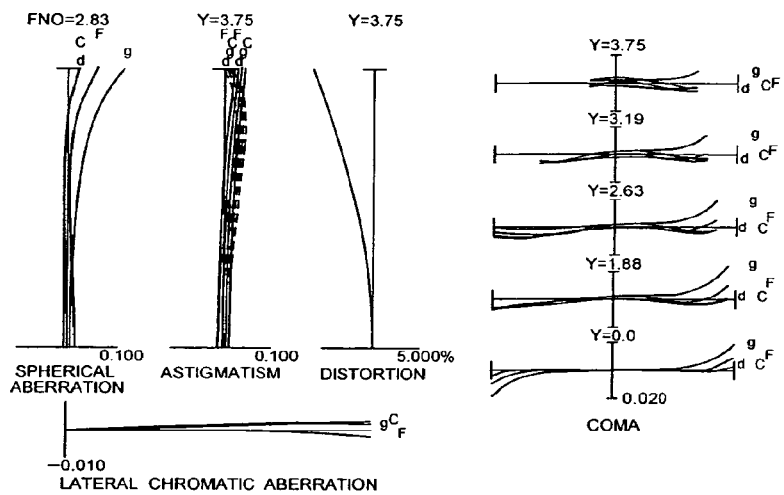
Figure 2B:
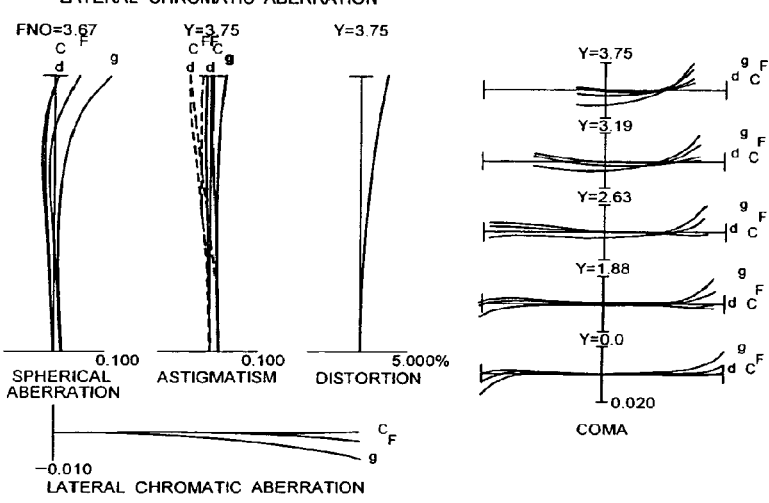
Figure 2C:
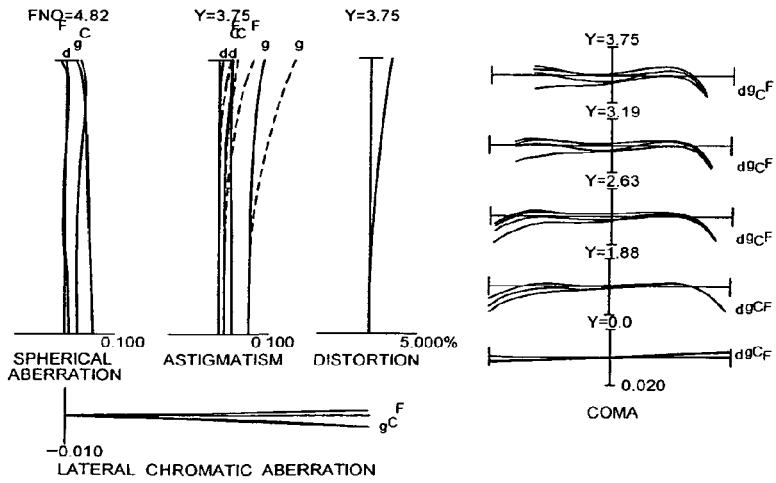
Figure 3A:
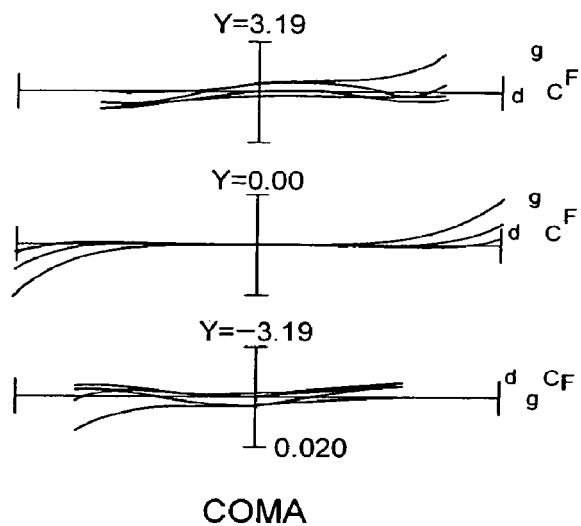
Figure 3B:
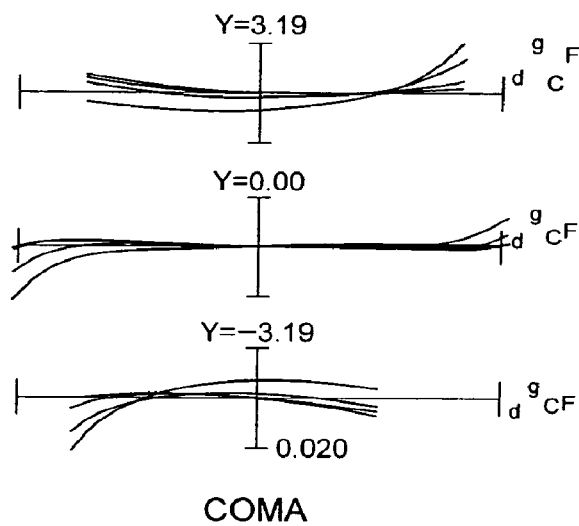
Figure 3C:
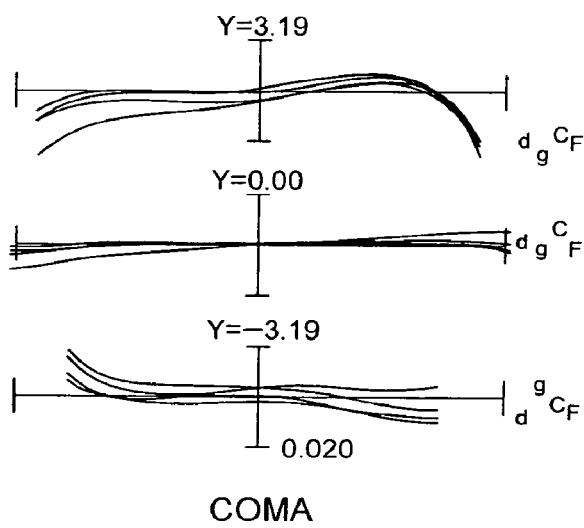
Figure 4A:
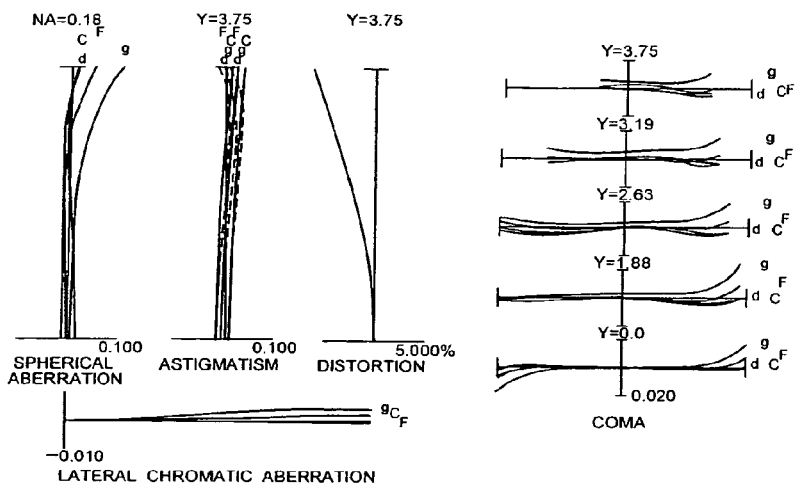
Figure 4B:
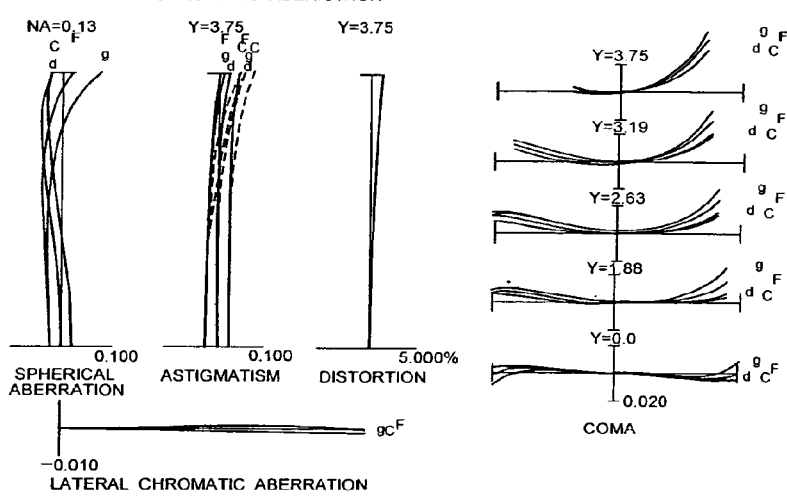
Figure 4C:
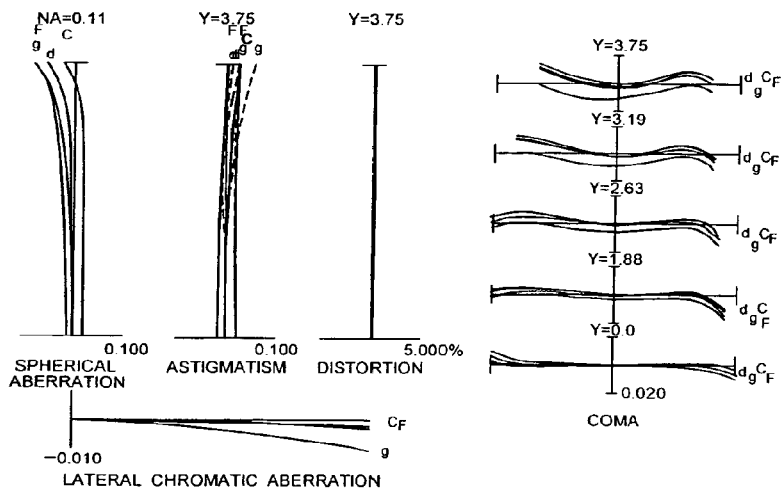
Figure 5A:
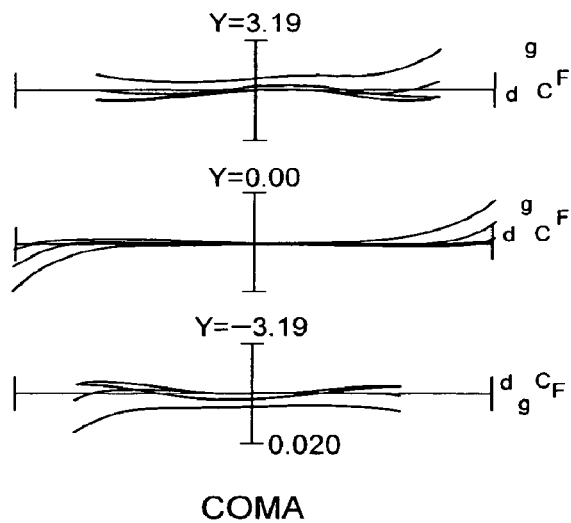
Figure 5B:
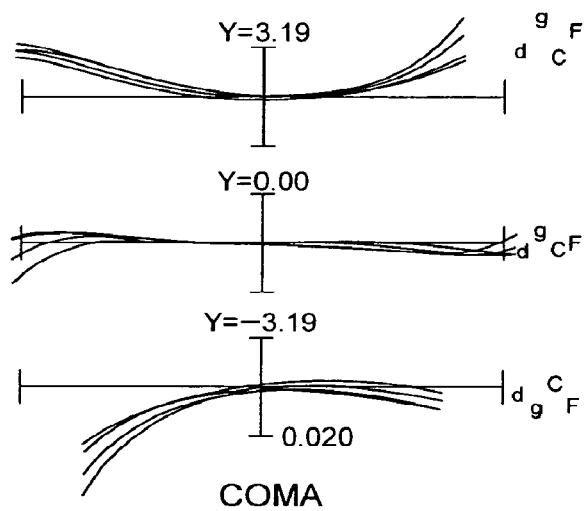
Figure 5C:
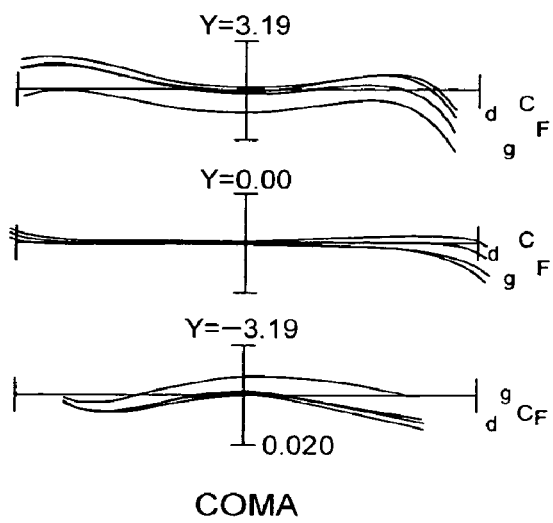

FIGS. 2A, 2B, and 2C are graphs showing various aberrations of the high zoom ratio zoom lens system according to Example 1 focusing on infinity in which FIG. 2A shows various aberrations in the wide-angle end state, FIG. 2B shows various aberrations in an intermediate focal length state, and FIG. 2C shows various aberrations in a telephoto end state. FIGS. 3A, 3B, and 3C are graphs showing coma of the high zoom ratio zoom lens system according to Example 1 focusing on infinity upon carrying out vibration reduction in which FIG. 3A shows coma in the wide-angle end state, FIG. 3B shows coma in the intermediate focal length state, and FIG. 3C shows coma in the telephoto end state. FIGS. 4A, 4B, and 4C are graphs showing various aberrations of the high zoom ratio zoom lens system according to Example 1 focusing on a close object in which FIG. 4A shows various aberrations in the wide-angle end state (Rw=300 mm), FIG. 4B shows various aberrations in the intermediate focal length state (Rm=300 mm), and FIG. 4C shows various aberrations in the telephoto end state (Rt=1000 mm). FIGS. 5A, 5B, and 5C are graphs showing coma of the high zoom ratio zoom lens system according to Example 1 focusing on a close object upon carrying out vibration reduction in which FIG. 5A shows coma in the wide-angle end state (Rw=300 mm), FIG. 5B shows coma in the intermediate focal length state (Rm=300 mm), and FIG. 5C shows coma in the telephoto end state (Rt=1000 mm).

In respective graphs, Y denotes an image height, NA denotes a numerical aperture, D denotes aberration curve at d-line (wavelength λ=587.6 nm), and G denotes aberration curve at g-line (wavelength λ=435.8 nm), C denotes aberration curve at C-line (wavelength λ=656.3 nm), F denotes aberration curve at F-line (wavelength λ=486.1 nm). In the graph showing astigmatism, a solid line indicates a sagittal image plane, and a broken line indicates a meridional image plane. In the graph showing lateral chromatic aberration, aberration values with respect to d-line are shown. The above-described explanation regarding various aberration graphs is the same as the other examples.

As is apparent from the respective graphs, the high zoom ratio zoom lens system according to Example 1 shows superb optical performance as a result of good corrections to various aberrations in each focal length state.

In Example 1, the effective diameter Φ1 of the cemented positive lens which is the most object side lens in the first lens group G1 is 24.0 mm, and the distance along the optical axis of the first lens group G1 is 7.4 mm. When these values are normalized by the image height IH in the wide-angle end state, the effective diameter Φ of the first lens group G1 is 6.40, and the distance along the optical axis of the first lens group G1 is 1.97, so that it becomes very compact design. A half angle of view in the telephoto end state is about 3.3 degrees.

Example 2

Figure 6:
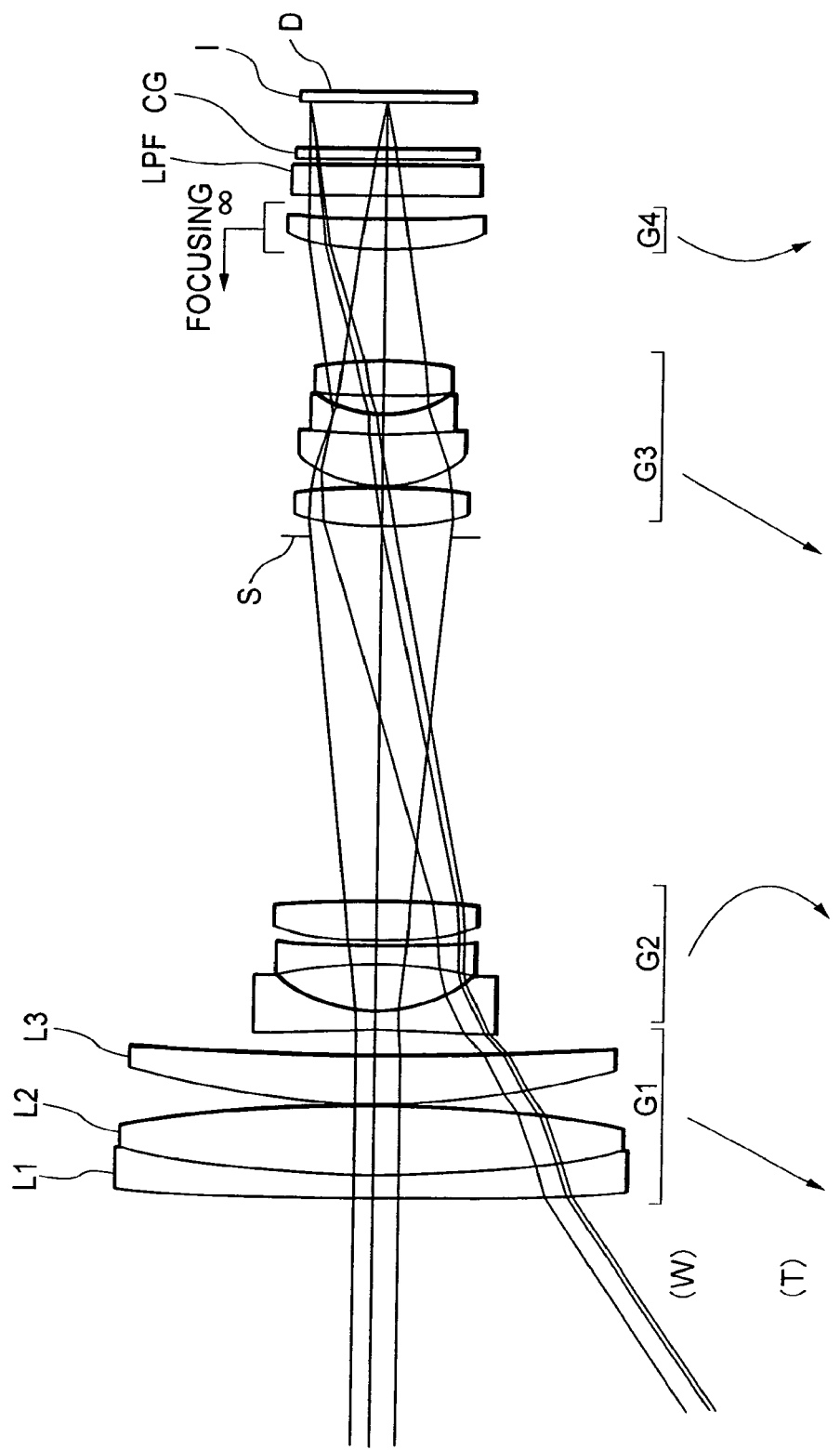
FIG. 6 is a diagram showing a lens configuration of a high zoom ratio zoom lens system according to Example 2 and positions of respective lens groups in a wide-angle end state W upon focusing on infinity.

FIG. 6 is a diagram showing a lens configuration of a high zoom ratio zoom lens system according to Example 2 of the present application and positions of respective lens groups in a wide-angle end state W upon focusing on infinity.

In FIG. 6, the high zoom ratio zoom lens system according to Example 2 is composed of, in order from the object, a first lens group G1 having positive refractive power, a second lens group G2 having negative refractive power, an aperture stop S, a third lens group G3 having positive refractive power, a fourth lens group G4 having positive refractive power, an optical low-pass filter LPF, and a cover glass CG for a solid-state imaging device D.

The first lens group G1 is composed of, in order from the object, a cemented positive lens constructed by a negative meniscus lens L1 having a convex surface facing the object cemented with a double convex positive lens L2, and a positive meniscus lens L3 having a convex surface facing the object.

The second lens group G2 is composed of, in order from the object, a double concave negative lens having an aspherical surface facing the image, a double concave negative lens, and a double convex positive lens.

The third lens group G3 is composed of, in order from the object, a double convex positive lens having an aspherical surface facing the object, a cemented negative lens constructed by a positive meniscus lens having a convex surface facing the object cemented with a negative meniscus lens having a convex surface facing the object, and a double convex positive lens.

The fourth lens group G4 is composed only of a positive meniscus lens having a convex surface facing the object.

Various values associated with Example 2 are listed in Table 2.

TABLE 2

| [Specifications] | | |
|---|---|---|
|  | W | T |
| f = | 6.45 | 61.00 |
| FNO = | 2.8 | 4.7 |

TABLE 2-continued

[Lens Data]

| | r | d | ν | nd | |
|---|---|---|---|---|---|
| 1) | 162.5689 | 1.2000 | 28.27 | 2.003300 | Φ1 = 24.4 |
| 2) | 46.7928 | 3.8000 | 69.98 | 1.518601 | |
| 3) | −68.1499 | 0.1000 | | | |
| 4) | 31.3282 | 2.5000 | 52.30 | 1.748099 | |
| 5) | 99.7504 | (d5) | | | |
| 6) | −457.7760 | 1.0000 | 46.83 | 1.766840 | |
| *7) | 6.5782 | 2.5000 | | | |
| 8) | −21.3438 | 1.0000 | 46.63 | 1.816000 | |
| 9) | 36.7963 | 0.3000 | | | |
| 10) | 15.2216 | 2.0000 | 22.76 | 1.808095 | |
| 11) | −79.6271 | (d11) | | | |
| 12>) | ∞ | 0.5000 | Aperture Stop S | | |
| *13) | 12.4940 | 2.1000 | 59.56 | 1.583130 | |
| 14) | −25.9498 | 0.1000 | | | |
| 15) | 5.4588 | 2.8000 | 82.56 | 1.497820 | |
| 16) | 32.2366 | 1.0000 | 32.35 | 1.850260 | |
| 17) | 4.6464 | 1.1000 | | | |
| 18) | 27.9391 | 1.7000 | 82.56 | 1.497820 | |
| 19) | −30.2282 | (d19) | | | |
| 20) | 11.3835 | 1.7000 | 82.56 | 1.497820 | |
| 21) | 34.8970 | (d21) | | | |
| 22) | ∞ | 1.6500 | 64.14 | 1.516330 | |
| 23) | ∞ | 0.4000 | | | |
| 24) | ∞ | 0.5000 | 64.14 | 1.516330 | |
| 25) | ∞ | (Bf) | | | |

[Aspherical Data]

Surface Number 7

κ = 0.8677
C4 = 0.00000E+00
C6 = 2.08140E−06
C8 = −6.51760E−08

Surface Number 13

κ = −1.0071
C4 = 0.00000E+00
C6 = −6.78930E−07
C8 = 0.00000E+00

[Variable Distances]

| | W | M | T |
|---|---|---|---|
| <Focusing on infinity> | | | |
| f = | 6.45456 | 30.00000 | 61.00000 |
| D0 = | ∞ | ∞ | ∞ |
| d5 = | 1.23770 | 23.86100 | 28.52458 |
| d11 = | 19.86637 | 5.07968 | 0.65039 |
| d19 = | 5.97265 | 8.71770 | 19.29477 |
| d21 = | 1.30843 | 5.10170 | 1.31355 |
| Bf = | 2.49252 | 2.49252 | 2.49252 |
| TL = | 58.82766 | 73.20259 | 80.22581 |
| <Focusing on a close object> | | | |
| β = | −0.02513 | −0.09818 | −0.05459 |
| D0 = | 241.1723 | 226.7973 | 919.7742 |
| d5 = | 1.23770 | 23.86100 | 28.52458 |
| d11 = | 19.86637 | 5.07968 | 0.65039 |
| d19 = | 5.56709 | 4.16855 | 13.09005 |
| d21 = | 1.71398 | 9.65085 | 7.51827 |
| Bf = | 2.49252 | 2.49252 | 2.49252 |
| TL = | 58.82766 | 73.20259 | 80.22581 |

[Values for Conditional Expressions]

(1): FG1 × (Nd1 − Nd2)/FL3 = 0.397
(2): FG1/FL12 = 0.173
(3): FG1/(FL3 × Nd3) = 0.469
(4): Fw/(Ft × FL12) × 0.00037 (unit: 1/mm)

Figure 7A:
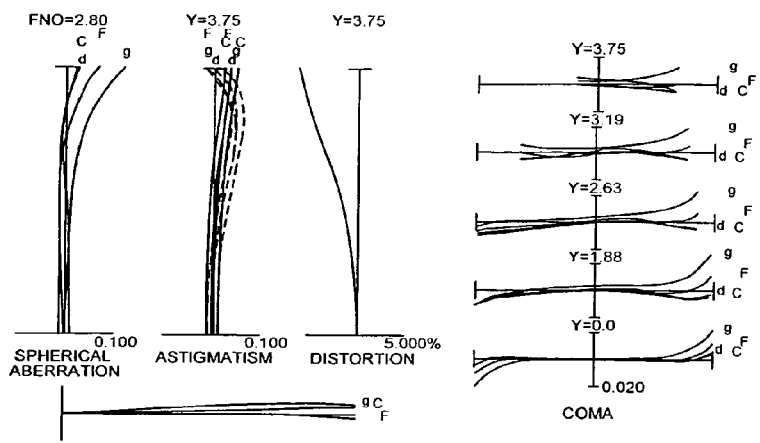
Figure 7B:
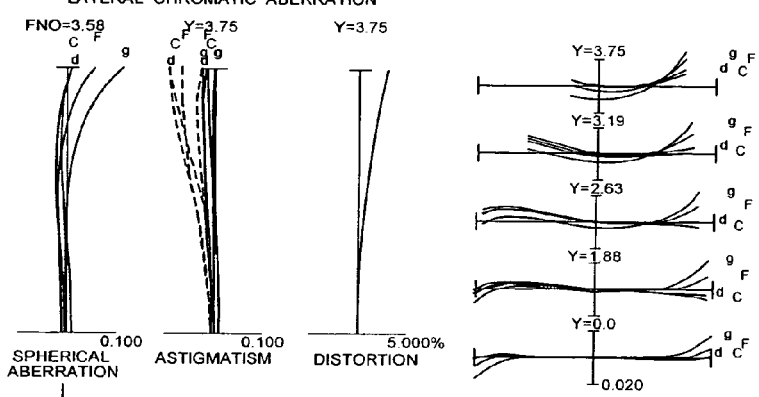
Figure 7C:
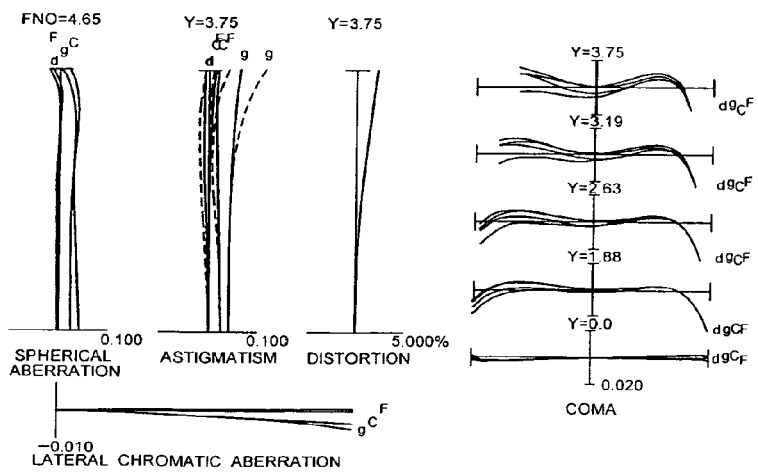
Figure 8A:
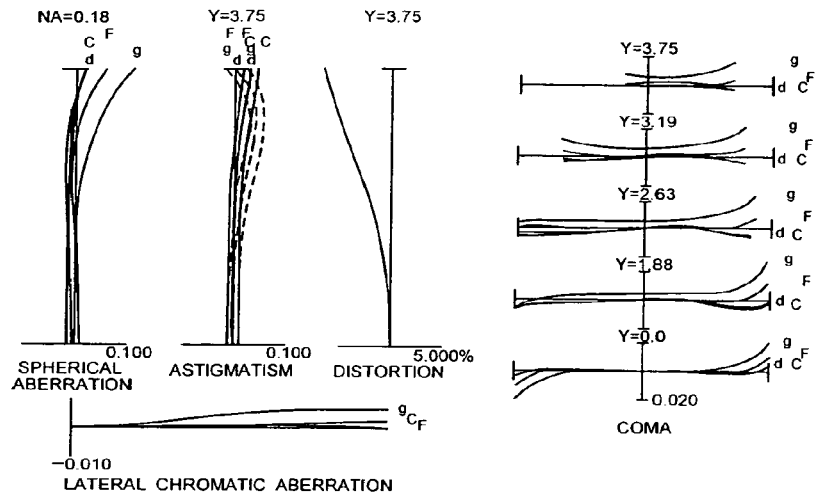
Figure 8B:
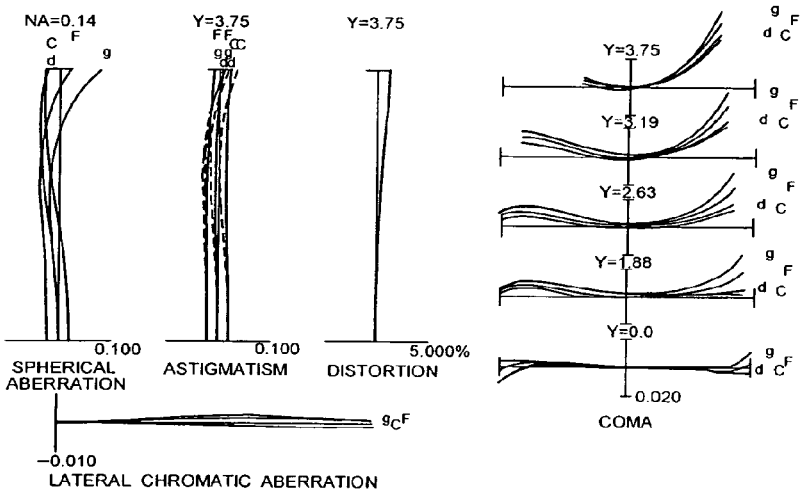
Figure 8C:
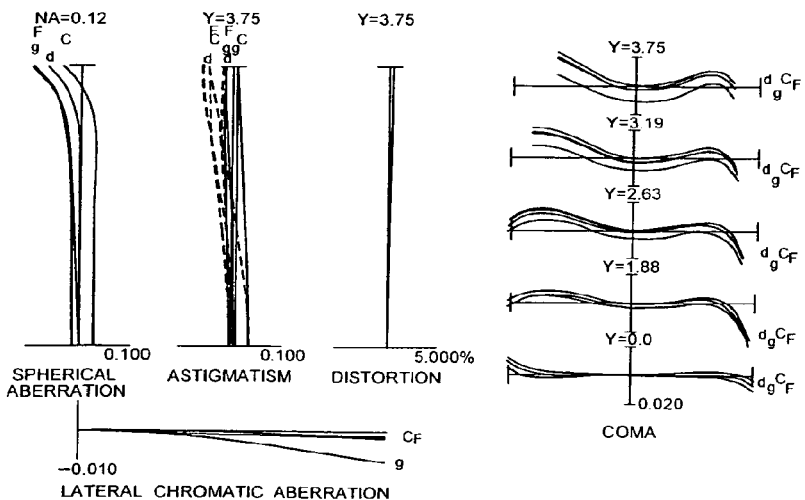

FIGS. 7A, 7B, and 7C are graphs showing various aberrations of the high zoom ratio zoom lens system according to Example 2 focusing on infinity in which FIG. 7A shows various aberrations in the wide-angle end state, FIG. 7B shows various aberrations in an intermediate focal length state, and FIG. 7C shows various aberrations in a telephoto end state. FIGS. 8A, 8B, and 8C are graphs showing various aberrations of the high zoom ratio zoom lens system according to Example 2 focusing on a close object in which FIG. 8A shows various aberrations in the wide-angle end state (Rw=300 mm), FIG. 8B shows various aberrations in the intermediate focal length state (Rm=300 mm), and FIG. 8C shows various aberrations in the telephoto end state (Rt=1000 mm).

As is apparent from the respective graphs, the high zoom ratio zoom lens system according to Example 2 shows superb optical performance as a result of good corrections to various aberrations in each focal length state.

In Example 2, the effective diameter Φ1 of the cemented positive lens which is the most object side lens in the first lens group G1 is 24.4 mm, and the distance along the optical axis of the first lens group G1 is 7.6 mm. When these values are normalized by the image height IH in the wide-angle end state, the effective diameter Φ of the first lens group G1 is 6.51, and the distance along the optical axis of the first lens group G1 is 2.03, so that it becomes very compact design. A half angle of view in the telephoto end state is about 3.4 degrees.

Example 3

FIG. 9 is a diagram showing a lens configuration of a high zoom ratio zoom lens system according to Example 3 of the present application and positions of respective lens groups in a wide-angle end state W upon focusing on infinity.

In FIG. 9, the high zoom ratio zoom lens system according to Example 3 is composed of, in order from the object, a first lens group G1 having positive refractive power, a second lens group G2 having negative refractive power, an aperture stop S, a third lens group G3 having positive refractive power, a fourth lens group G4 having positive refractive power, an optical low-pass filter LPF, and a cover glass CG for a solid-state imaging device D.

The first lens group G1 is composed of, in order from the object, a cemented negative lens constructed by a negative meniscus lens L1 having a convex surface facing the object cemented with a double convex positive lens L2, and a positive meniscus lens L3 having a convex surface facing the object.

The second lens group G2 is composed of, in order from the object, a double concave negative lens having an aspherical surface facing the image, a double concave negative lens, and a double convex positive lens.

The third lens group G3 is composed of, in order from the object, a double convex positive lens having an aspherical surface facing the object, a positive meniscus lens having a convex surface facing the object, a negative meniscus lens having a convex surface facing the object, and a double convex positive lens.

The fourth lens group G4 is composed only of a positive meniscus lens having a convex surface facing the object.

Various values associated with Example 3 are listed in Table 3.

TABLE 3

[Specifications]

|  | W | T |
|---|---|---|
| f = | 6.45 | 73.00 |
| FNO = | 2.8 | 4.6 |

[Lens Data]

|  | r | d | ν | nd |  |
|---|---|---|---|---|---|
| 1) | 105.3671 | 1.3000 | 25.46 | 2.000690 | Φ1 = 28.4 |
| 2) | 40.5047 | 4.2000 | 82.56 | 1.497820 |  |
| 3) | −229.3012 | 0.1000 |  |  |  |
| 4) | 40.3105 | 3.3000 | 39.82 | 1.869940 |  |
| 5) | 302.7015 | (d5) |  |  |  |
| 6) | −969.6596 | 1.0000 | 46.83 | 1.766840 |  |
| *7) | 6.4483 | 2.7000 |  |  |  |
| 8) | −18.4419 | 1.0000 | 46.63 | 1.816000 |  |
| 9) | 59.6186 | 0.6191 |  |  |  |
| 10) | 18.7501 | 2.0000 | 23.82 | 1.846660 |  |
| 11) | −56.0348 | (d11) |  |  |  |
| 12> | ∞ | 0.5000 | Aperture Stop S |  |  |
| *13) | 12.3233 | 2.0000 | 59.56 | 1.583130 |  |
| 14) | −93.1301 | 0.8468 |  |  |  |
| 15) | 7.0019 | 2.4000 | 82.56 | 1.497820 |  |
| 16) | 151.4598 | 0.7073 |  |  |  |
| 17) | 77.5884 | 1.0000 | 32.35 | 1.850260 |  |
| 18) | 6.0577 | 1.0000 |  |  |  |
| 19) | 50.2973 | 1.5000 | 82.56 | 1.497820 |  |
| 20) | −16.3952 | (d20) |  |  |  |
| 21) | 13.1485 | 1.7000 | 82.56 | 1.497820 |  |
| 22) | 61.9770 | (d22) |  |  |  |
| 23) | ∞ | 1.6500 | 64.14 | 1.516330 |  |
| 24) | ∞ | 0.4000 |  |  |  |
| 25) | ∞ | 0.5000 | 64.14 | 1.516330 |  |
| 26) | ∞ | (Bf) |  |  |  |

[Aspherical Data]

Surface Number 7

κ = 0.7983
C4 = 0.00000E+00
C6 = −1.48870E−06
C8 = 6.82290E−09

Surface Number 13

κ = −0.4909
C4 = 0.00000E+00
C6 = −3.58780E−07
C8 = 0.00000E+00

[Variable Distances]

|  | W | M | T |
|---|---|---|---|
| <Focusing on infinity> | | | |
| f = | 6.45456 | 36.00000 | 73.00000 |
| D0 = | ∞ | ∞ | ∞ |
| d5 = | 1.23770 | 30.27108 | 34.87241 |
| d11 = | 21.41216 | 5.39440 | 0.92620 |
| d19 = | 5.12179 | 9.86494 | 22.34900 |
| d21 = | 4.00252 | 7.18660 | 2.51739 |
| Bf = | 2.91721 | 2.91721 | 2.91721 |
| TL = | 65.11465 | 86.05750 | 94.00548 |
| <Focusing on a close object> | | | |
| β = | −0.02575 | −0.11010 | −0.06203 |
| D0 = | 234.8854 | 213.9425 | 905.9945 |
| d5 = | 1.23770 | 30.27108 | 34.87241 |
| d11 = | 21.41216 | 5.39440 | 0.92620 |
| d19 = | 4.80576 | 4.50711 | 15.02482 |
| d21 = | 4.31855 | 12.54442 | 9.84157 |

TABLE 3-continued

| Bf = | 2.91721 | 2.91721 | 2.91721 |
|---|---|---|---|
| TL = | 65.11465 | 86.05750 | 94.00548 |

[Values for Conditional Expressions]

(1): FG1 × (Nd1 − Nd2)/FL3 = 0.520
(2): FG1/FL12 = −0.037
(3): FG1/(FL3 × Nd3) = 0.553
(4): Fw/(Ft × FL12) = −0.00006 (unit: 1/mm)

Figure 10A:
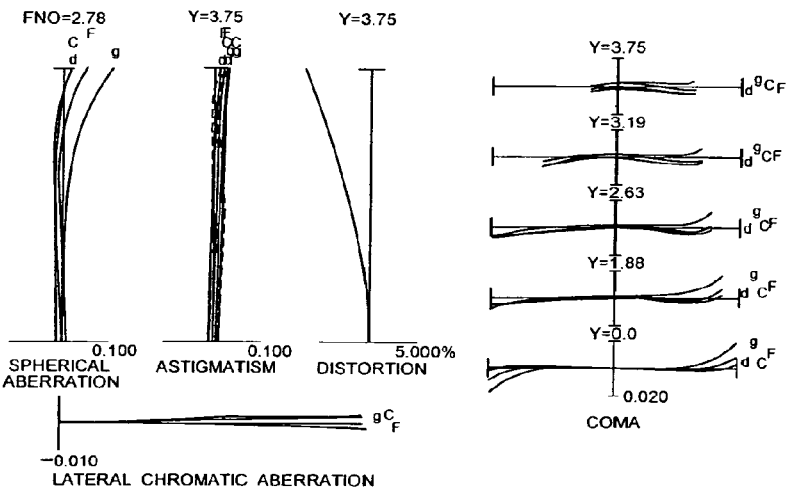
Figure 10B:
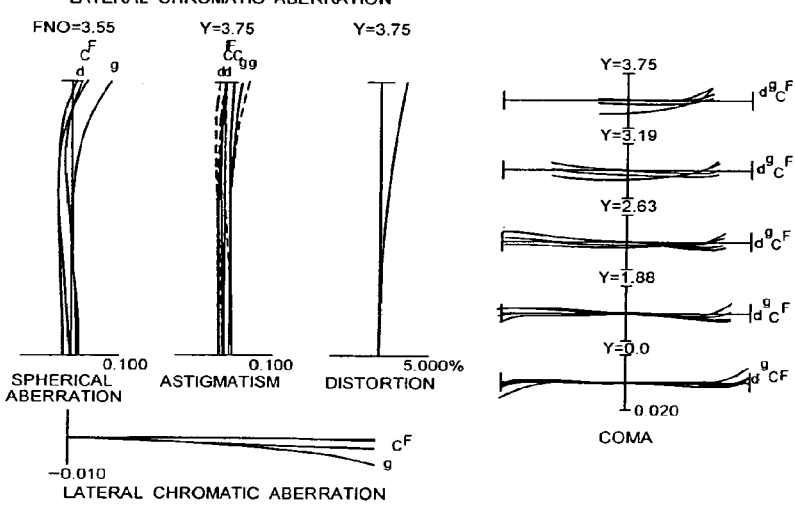
Figure 10C:
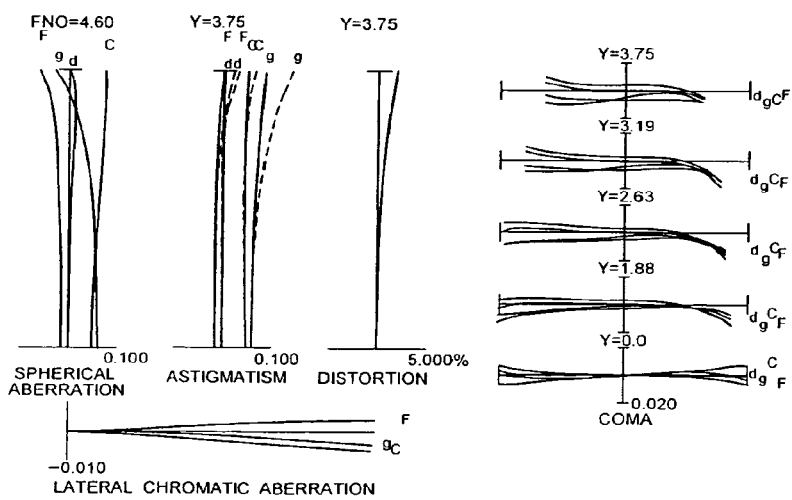
Figure 11A:
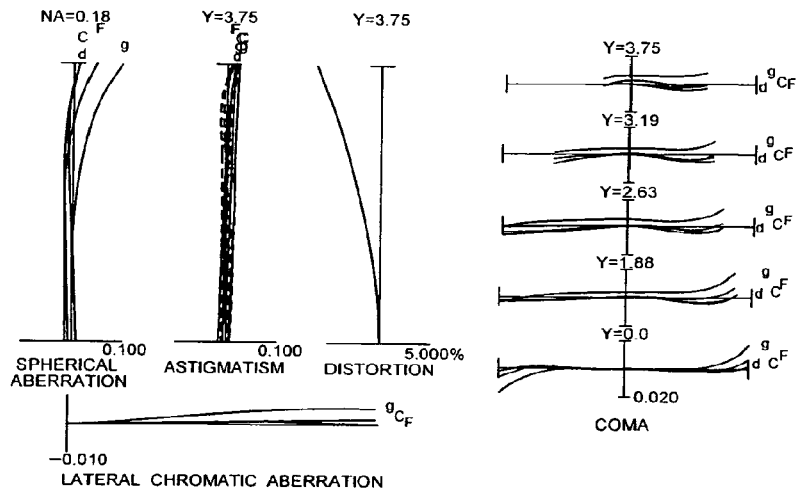
Figure 11B:
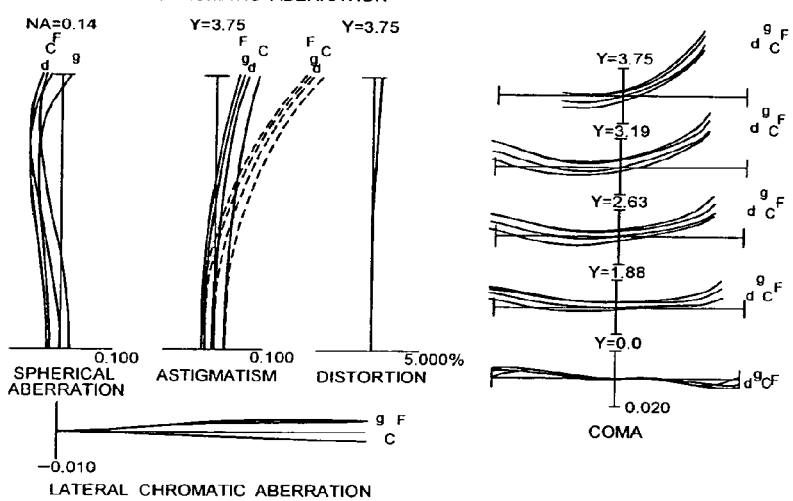
Figure 11C:
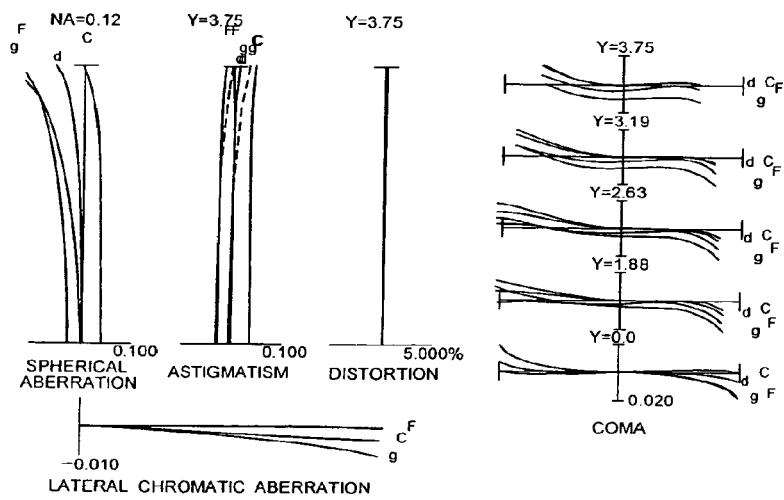

FIGS. 10A, 10B, and 10C are graphs showing various aberrations of the high zoom ratio zoom lens system according to Example 3 focusing on infinity in which FIG. 10A shows various aberrations in the wide-angle end state, FIG. 10B shows various aberrations in an intermediate focal length state, and FIG. 10C shows various aberrations in a telephoto end state. FIGS. 11A, 11B, and 11C are graphs showing various aberrations of the high zoom ratio zoom lens system according to Example 3 focusing on a close object in which FIG. 11A shows various aberrations in the wide-angle end state (Rw=300 mm), FIG. 11B shows various aberrations in the intermediate focal length state (Rm=300 mm), and FIG. 11C shows various aberrations in the telephoto end state (Rt=1100 mm).

As is apparent from the respective graphs, the high zoom ratio zoom lens system according to Example 3 shows superb optical performance as a result of good corrections to various aberrations in each focal length state.

In Example 3, the effective diameter Φ1 of the cemented positive lens which is the most object side lens in the first lens group G1 is 28.4 mm, and the distance along the optical axis of the first lens group G1 is 8.9 mm. When these values are normalized by the image height IH in the wide-angle end state, the effective diameter Φ of the first lens group G1 is 7.57, and the distance along the optical axis of the first lens group G1 is 2.37, so that it becomes very compact design. A half angle of view in the telephoto end state is about 2.9 degrees.

Example 4

FIG. 12 is a diagram showing a lens configuration of a high zoom ratio zoom lens system according to Example 4 of the present application and positions of respective lens groups in a wide-angle end state W upon focusing on infinity.

In FIG. 12, the high zoom ratio zoom lens system according to Example 4 is composed of, in order from the object, a first lens group G1 having positive refractive power, a second lens group G2 having negative refractive power, an aperture stop S, a third lens group G3 having positive refractive power, a fourth lens group G4 having positive refractive power, an optical low-pass filter LPF, and a cover glass CG for a solid-state imaging device D.

The first lens group G1 is composed of, in order from the object, a cemented positive lens constructed by a negative meniscus lens L1 having a convex surface facing the object cemented with a double convex positive lens L2, and a positive meniscus lens L3 having a convex surface facing the object.

The second lens group G2 is composed of, in order from the object, a double concave negative lens having an aspherical surface facing the image, a double concave negative lens, and a double convex positive lens.

The third lens group G3 is composed of, in order from the object, a double convex positive lens having an aspherical surface facing the object, a double convex positive lens, a negative meniscus lens having a convex surface facing the object, and a double convex positive lens.

The fourth lens group G4 is composed only of a positive meniscus lens having a convex surface facing the object.

Various values associated with Example 4 are listed in Table 4.

TABLE 4

[Specifications]

|  | W | T |
|---|---|---|
| f = | 6.45 | 73.00 |
| FNO = | 2.8 | 4.7 |

[Lens Data]

|  | r | d | ν | nd |  |
|---|---|---|---|---|---|
| 1) | 114.8778 | 1.3000 | 31.31 | 1.903660 | Φ1 = 27.2 |
| 2) | 38.2532 | 4.3000 | 82.56 | 1.497820 |  |
| 3) | −133.4350 | 0.1000 |  |  |  |
| 4) | 35.9463 | 3.4000 | 52.30 | 1.748099 |  |
| 5) | 267.7891 | (d5) |  |  |  |
| 6) | −70.6402 | 1.0000 | 46.83 | 1.766840 |  |
| *7) | 6.0499 | 2.7000 |  |  |  |
| 8) | −19.5115 | 1.0000 | 46.63 | 1.816000 |  |
| 9) | 198.7346 | 0.1500 |  |  |  |
| 10) | 17.1991 | 2.0000 | 23.82 | 1.846660 |  |
| 11) | −60.3664 | (d11) |  |  |  |
| 12> | ∞ | 0.5000 | Aperture Stop S |  |  |
| *13) | 13.7985 | 2.0000 | 59.56 | 1.583130 |  |
| 14) | −107.5899 | 0.1000 |  |  |  |
| 15) | 7.3649 | 2.4000 | 82.56 | 1.497820 |  |
| 16) | −122.8168 | 1.1970 |  |  |  |
| 17) | 226.2370 | 1.0000 | 32.35 | 1.850260 |  |
| 18) | 6.4401 | 1.0000 |  |  |  |
| 19) | 442.8729 | 1.5000 | 82.56 | 1.497820 |  |
| 20) | −12.2788 | (d20) |  |  |  |
| 21) | 12.7102 | 1.7000 | 82.56 | 1.497820 |  |
| 22) | 52.8979 | (d22) |  |  |  |
| 23) | ∞ | 1.6500 | 64.14 | 1.516330 |  |
| 24) | ∞ | 0.4000 |  |  |  |
| 25) | ∞ | 0.5000 | 64.14 | 1.516330 |  |
| 26) | ∞ | (Bf) |  |  |  |

[Aspherical Data]

Surface Number 7

κ = 0.5817
C4 = 0.00000E+00
C6 = −5.70420E−07
C8 = −4.27120E−08

Surface Number 13

κ = −1.5666
C4 = 0.00000E+00
C6 = −1.06760E−06
C8 = 0.00000E+00

[Variable Distances]

|  | W | M | T |
|---|---|---|---|

<Focusing on infinity>

| f = | 6.45456 | 36.00000 | 73.00000 |
| D0 = | ∞ | ∞ | ∞ |
| d5 = | 1.23770 | 28.27772 | 32.49665 |
| d11 = | 21.60317 | 5.45968 | 0.92619 |
| d19 = | 5.31480 | 10.29980 | 23.12899 |
| d21 = | 4.00252 | 7.10437 | 2.29346 |
| Bf = | 2.88464 | 2.88464 | 2.88464 |
| TL = | 64.93983 | 83.92322 | 91.62693 |

TABLE 4-continued

<Focusing on a close object>

| β = | −0.02571 | −0.11140 | −0.06224 |
| D0 = | 235.0602 | 216.0768 | 908.3731 |
| d5 = | 1.23770 | 28.27772 | 32.49665 |
| d11 = | 21.60317 | 5.45968 | 0.92619 |
| d19 = | 4.99956 | 4.87303 | 15.71039 |
| d21 = | 4.31775 | 12.53114 | 9.71205 |
| Bf = | 2.88464 | 2.88464 | 2.88464 |
| TL = | 64.93983 | 83.92322 | 91.62693 |

[Values for Conditional Expressions]

(1): FG1 × (Nd1 − Nd2)/FL3 = 0.383
(2): FG1/FL12 = 0.055
(3): FG1/(FL3 × Nd3) = 0.539
(4): Fw/(Ft × FL12) = 0.00009 (unit: 1/mm)

Figure 13A:
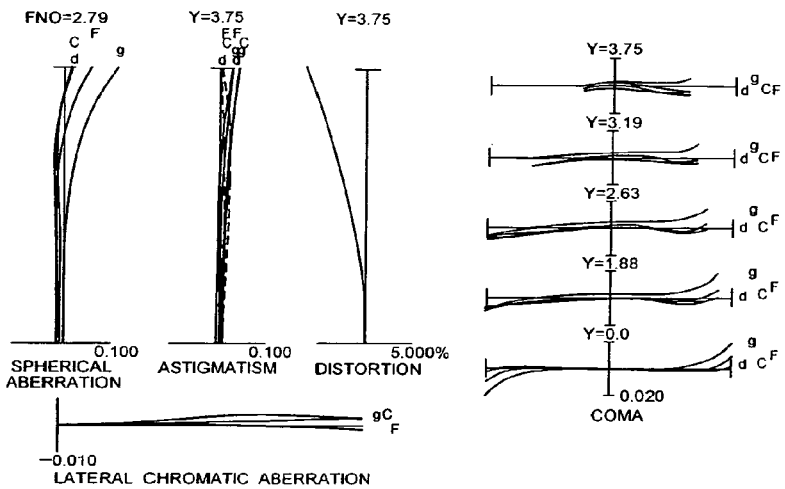
Figure 13B:
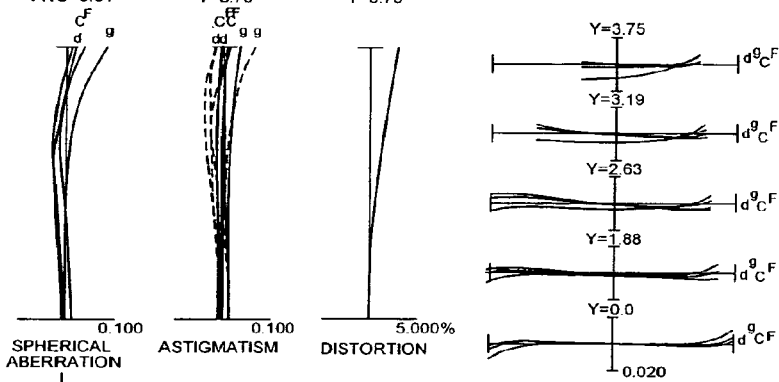
Figure 13C:
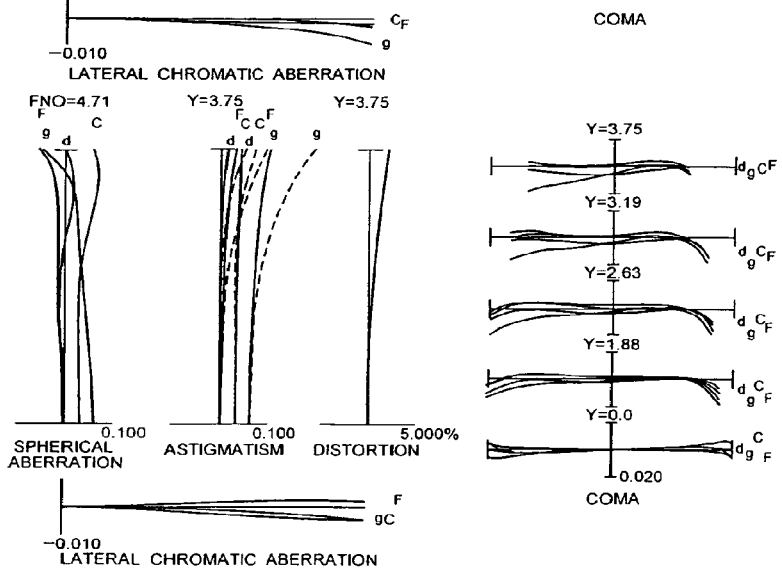
Figure 14A:
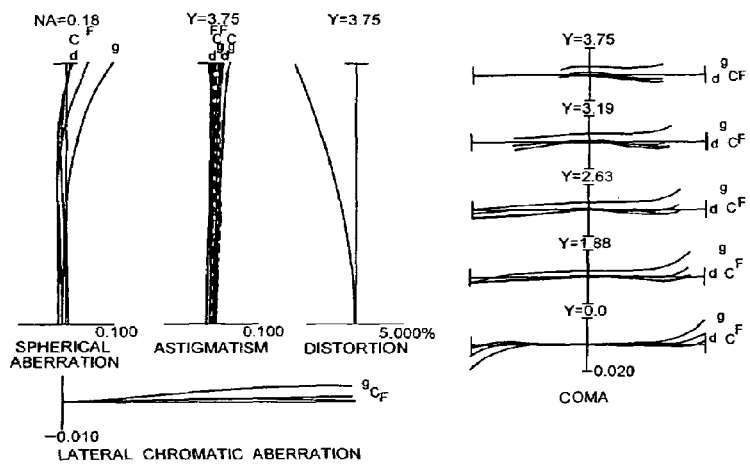
Figure 14B:
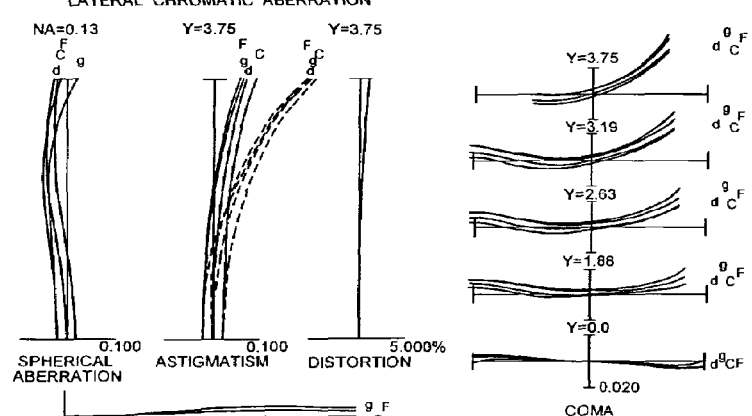
Figure 14C:
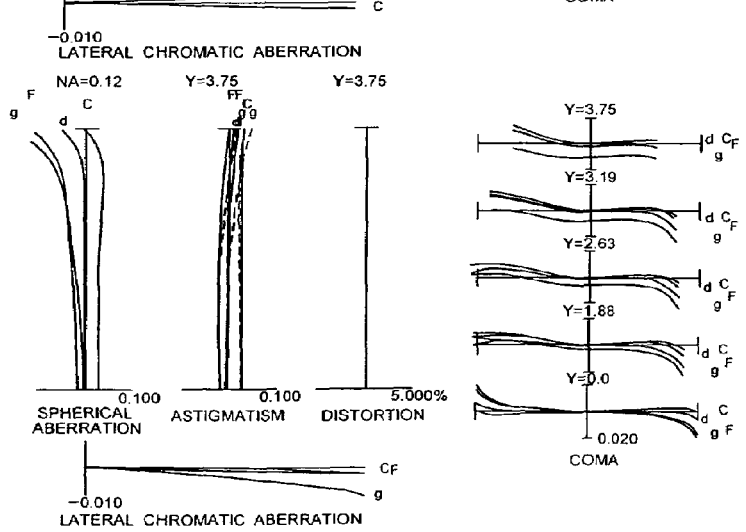

FIGS. 13A, 13B, and 13C are graphs showing various aberrations of the high zoom ratio zoom lens system according to Example 4 focusing on infinity in which FIG. 13A shows various aberrations in the wide-angle end state, FIG. 13B shows various aberrations in an intermediate focal length state, and FIG. 13C shows various aberrations in a telephoto end state. FIGS. 14A, 14B, and 14C are graphs showing various aberrations of the high zoom ratio zoom lens system according to Example 4 focusing on a close object in which FIG. 14A shows various aberrations in the wide-angle end state (Rw=300 mm), FIG. 14B shows various aberrations in the intermediate focal length state (Rm=300 mm), and FIG. 14C shows various aberrations in the telephoto end state (Rt=1000 mm).

As is apparent from the respective graphs, the high zoom ratio zoom lens system according to Example 4 shows superb optical performance as a result of good corrections to various aberrations in each focal length state.

In Example 4, the effective diameter Φ1 of the cemented positive lens which is the most object side lens in the first lens group G1 is 27.2 mm, and the distance along the optical axis of the first lens group G1 is 9.1 mm. When these values are normalized by the image height IH in the wide-angle end state, the effective diameter Φ of the first lens group G1 is 7.25, and the distance along the optical axis of the first lens group G1 is 2.43, so that it becomes very compact design. A half angle of view in the telephoto end state is about 2.9 degrees.

Example 5

Figure 15:
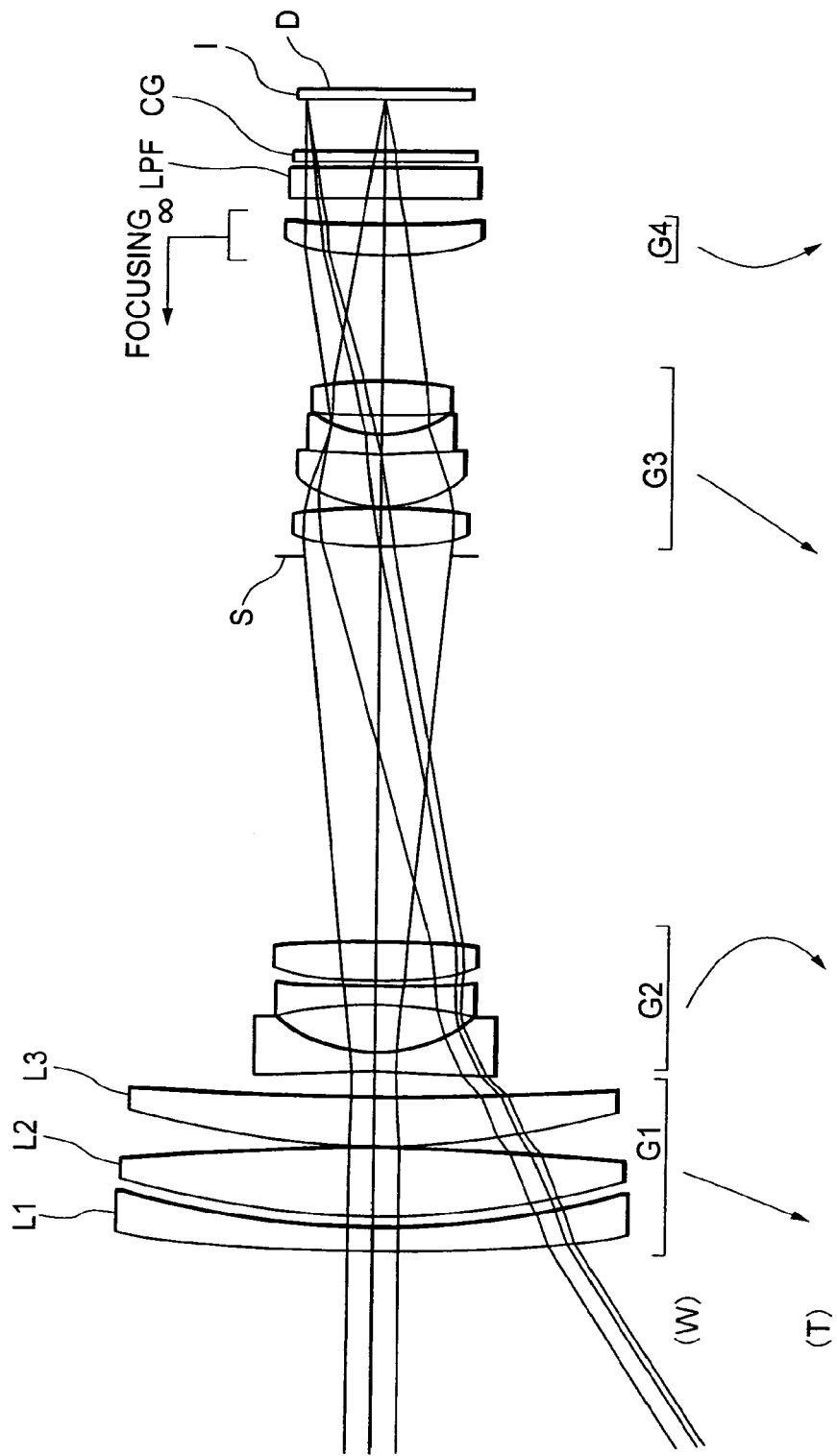
FIG. 15 is a diagram showing a lens configuration of a high zoom ratio zoom lens system according to Example 5 and positions of respective lens groups in a wide-angle end state W upon focusing on infinity.

FIG. 15 is a diagram showing a lens configuration of a high zoom ratio zoom lens system according to Example 5 of the present application and positions of respective lens groups in a wide-angle end state W upon focusing on infinity.

In FIG. 15, the high zoom ratio zoom lens system according to Example 5 is composed of, in order from the object, a first lens group G1 having positive refractive power, a second lens group G2 having negative refractive power, an aperture stop S, a third lens group G3 having positive refractive power, a fourth lens group G4 having positive refractive power, an optical low-pass filter LPF, and a cover glass CG for a solid-state imaging device D.

The first lens group G1 is composed of, in order from the object, a negative meniscus lens L1 having a convex surface facing the object, a double convex positive lens L2, and a positive meniscus lens L3 having a convex surface facing the object.

The second lens group G2 is composed of, in order from the object, a negative meniscus lens having a convex surface facing the object and an aspherical surface facing the image, a double concave negative lens, and a double convex positive lens.

The third lens group G3 is composed of, in order from the object, a double convex positive lens having an aspherical surface facing the object, a cemented negative lens constructed by a positive meniscus lens having a convex surface facing the object cemented with a negative meniscus lens having a convex surface facing the object, and a positive meniscus lens having a concave surface facing the object.

The fourth lens group G4 is composed only of a positive meniscus lens having a convex surface facing the object.

Various values associated with Example 5 are listed in Table 5.

TABLE 5

[Specifications]

| | W | T |
|---|---|---|
| f = | 6.78 | 64.00 |
| FNO = | 2.8 | 4.8 |

[Lens Data]

| | r | d | ν | nd | |
|---|---|---|---|---|---|
| 1) | 78.3046 | 1.2000 | 17.98 | 1.945950 | Φ1 = 24.0 |
| 2) | 39.4002 | 0.6000 | | | |
| 3) | 37.6247 | 3.6000 | 95.25 | 1.433852 | |
| 4) | −129.9339 | 0.1000 | | | |
| 5) | 40.4267 | 2.5000 | 28.56 | 1.795040 | |
| 6) | 222.2431 | (d5) | | | |
| 7) | 300.6396 | 1.0000 | 46.83 | 1.766840 | |
| *8) | 6.7469 | 2.5000 | | | |
| 9) | −15.8263 | 1.0000 | 46.63 | 1.816000 | |
| 10) | 148.8853 | 0.3000 | | | |
| 11) | 17.4512 | 2.0000 | 22.76 | 1.808095 | |
| 12) | −72.2994 | (d12) | | | |
| 13>) | ∞ | 0.5000 | Aperture Stop S | | |
| *14) | 13.2112 | 2.1000 | 59.56 | 1.583130 | |
| 15) | −23.8964 | 0.1000 | | | |
| 16) | 5.7501 | 2.8000 | 82.56 | 1.497820 | |
| 17) | 33.7455 | 1.0000 | 32.35 | 1.850260 | |
| 18) | 5.0095 | 1.1000 | | | |
| 19) | −199.5773 | 1.7000 | 82.56 | 1.49782 | |
| 20) | −16.5396 | (d20) | | | |
| 21) | 11.8839 | 1.7000 | 82.56 | 1.497820 | |
| 22) | 36.0583 | (d22) | | | |
| 23) | ∞ | 1.6500 | 64.14 | 1.516330 | |
| 24) | ∞ | 0.4000 | | | |
| 25) | ∞ | 0.5000 | 64.14 | 1.516330 | |
| 26) | ∞ | (Bf) | | | |

[Aspherical Data]

Surface Number 8

κ = 0.9497
C4 = 0.00000E+00
C6 = 3.75430E−07
C8 = 6.17210E−10

Surface Number 14

κ = −1.5496
C4 = 0.00000E+00
C6 = −3.73690E−07
C8 = 0.00000E+00

[Variable Distances]

| | W | M | T |
|---|---|---|---|

TABLE 5-continued

<Focusing on infinity>

| | | | |
|---|---|---|---|
| f = | 6.78000 | 32.00000 | 64.00000 |
| D0 = | ∞ | ∞ | ∞ |
| d5 = | 1.36890 | 25.19752 | 29.72851 |
| d11 = | 20.74528 | 5.28682 | 0.82364 |
| d19 = | 6.62965 | 10.39618 | 21.82119 |
| d21 = | 1.44574 | 4.94473 | 0.73813 |
| Bf = | 2.71203 | 1.07320 | 1.07320 |
| TL = | 61.25160 | 76.88727 | 84.17350 |

<Focusing on a close object>

| | | | |
|---|---|---|---|
| β = | −0.02652 | −0.10364 | −0.05645 |
| D0 = | 238.7484 | 223.1127 | 915.8265 |
| d5 = | 1.36890 | 25.19752 | 29.72851 |
| d11 = | 20.74528 | 5.28682 | 0.82364 |
| d19 = | 6.18084 | 5.20507 | 14.85627 |
| d21 = | 1.89455 | 10.13584 | 7.70305 |
| Bf = | 2.71202 | 1.07321 | 1.07321 |
| TL = | 61.25160 | 76.88728 | 84.17350 |

[Values for Conditional Expressions]

(1): FG1 × (Nd1 − Nd2)/FL3 = 0.429
(2): FG1/FL12 = 0.161
(3): FG1/(FL3 × Nd3) = 0.467
(4): Fw/(Ft × FL12) = 0.00033 (unit: 1/mm)

Figure 16A:
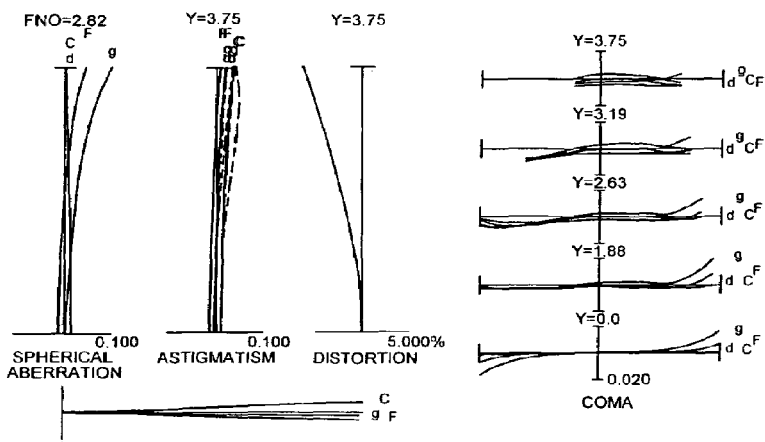
Figure 16B:
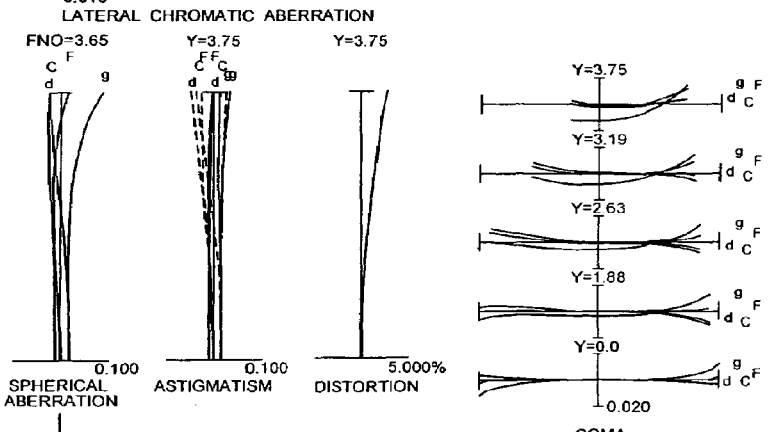
Figure 16C:
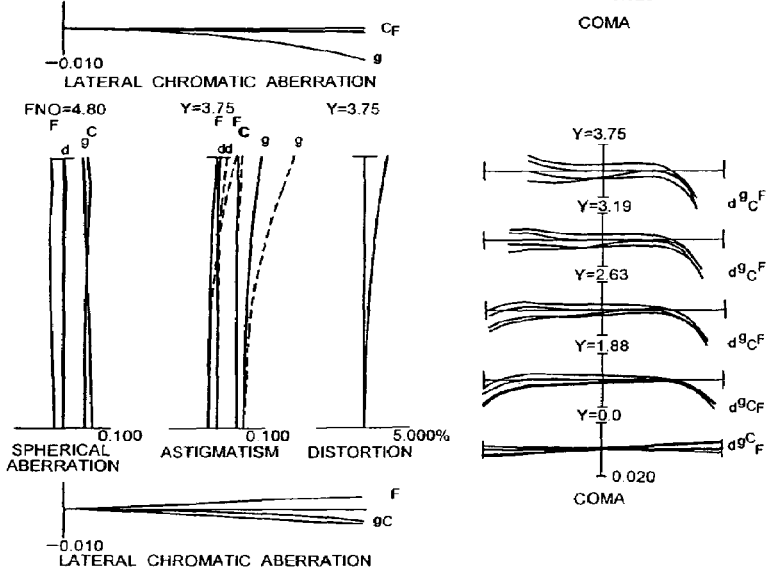
Figure 17A:
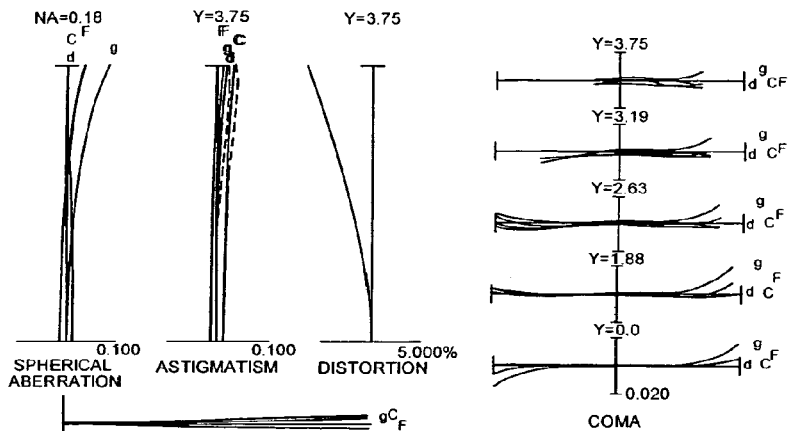
Figure 17B:
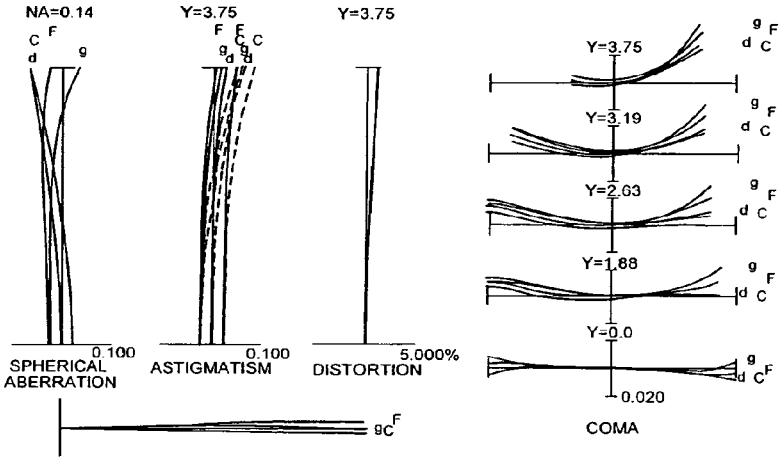
Figure 17C:
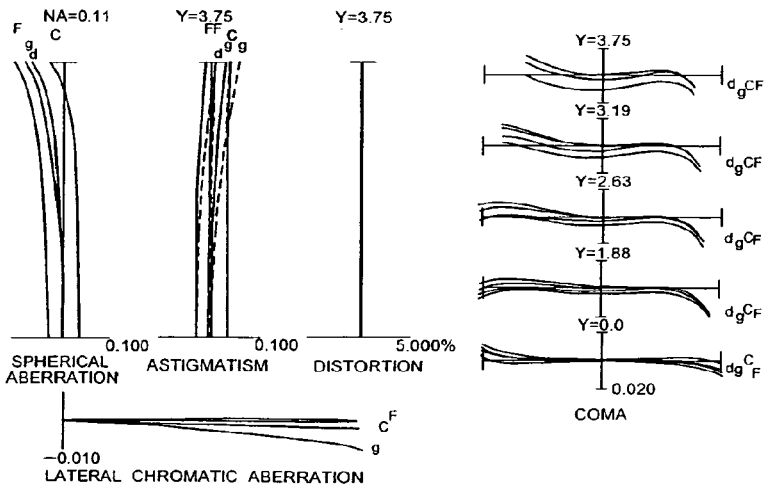

FIGS. 16A, 16B, and 16C are graphs showing various aberrations of the high zoom ratio zoom lens system according to Example 5 focusing on infinity in which FIG. 16A shows various aberrations in the wide-angle end state, FIG. 16B shows various aberrations in an intermediate focal length state, and FIG. 16C shows various aberrations in a telephoto end state. FIGS. 17A, 17B, and 17C are graphs showing various aberrations of the high zoom ratio zoom lens system according to Example 5 focusing on a close object in which FIG. 17A shows various aberrations in the wide-angle end state (Rw=300 mm), FIG. 17B shows various aberrations in the intermediate focal length state (Rm=300 mm), and FIG. 17C shows various aberrations in the telephoto end state (Rt=1000 mm).

As is apparent from the respective graphs, the high zoom ratio zoom lens system according to Example 5 shows superb optical performance as a result of good corrections to various aberrations in each focal length state.

In Example 5, the effective diameter Φ1 of the negative meniscus lens which is the most object side lens in the first lens group G1 is 24.0 mm, and the distance along the optical axis of the first lens group G1 is 8.0 mm. When these values are normalized by the image height IH in the wide-angle end state, the effective diameter Φ of the first lens group G1 is 6.40, and the distance along the optical axis of the first lens group G1 is 2.13, so that it becomes very compact design. A half angle of view in the telephoto end state is about 3.3 degrees.

Although an image blur due to a camera shake is corrected by decentering the third lens group G3 in Example 1 perpendicularly to the optical axis, an image blur may be corrected by the similar manner in other Examples. Correction of an image blur may be carried out by moving not only the third lens group G3 but also any lens or lens group in the zoom lens system perpendicularly to the optical axis. In order to correct chromatic aberration upon focusing on a close object, the fourth lens group may be a so-called achromatic composition composed of a positive lens and a negative lens.

As described above, the present application makes it possible to provide a high zoom ration zoom lens system having a small total lens length, a small effective diameter of the first lens group, a half angle of view of 3.5 degrees or less in the telephoto end state, a zoom ratio of about 10 or more, an f-number of six or less in the telephoto end state, and high optical performance in spite of extreme compactness. The present invention also makes it possible to provide a high zoom ration zoom lens system with a small moving amount of the first lens group upon zooming from the wide-angle end state to the telephoto end state.

It is needless to say that although a zoom lens system with a four-lens-group configuration is shown as each Example of the present invention, a zoom lens system simply added by a lens group to a four-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A high zoom ratio zoom lens system comprising, in order from an object:
   a first lens group having positive refractive power;
   a second lens group;
   a third lens group; and
   a fourth lens group;
   the first lens group including, in order from the object, a negative meniscus lens having a convex surface facing the object, a first positive lens having a convex surface facing the object, and a second positive lens,
   the first lens group and the second lens group being moved along the optical axis upon zooming from a wide-angle end state to a telephoto end state, and
   the following conditional expression being satisfied:

$$0.31 < FG1 \times (Nd1-Nd2)/FL3 < 0.75$$

where FG1 denotes a focal length of the first lens group, FL3 denotes a focal length of the second positive lens, Nd1 denotes refractive index of the negative meniscus lens at d-line (wavelength $\lambda$=587.6nm), and Nd2 denotes refractive index of the first positive lens at d-line (wavelength $\lambda$=587.6 nm).

2. The high zoom ratio zoom lens system according to claim 1, wherein the second lens group has negative refractive power, the third lens group has positive refractive power, and the fourth lens group has positive refractive power.

3. The high zoom ratio zoom lens system according to claim 1, wherein an aspherical surface is included in the second lens group, and an aspherical surface is included in the third lens group.

4. The high zoom ratio zoom lens system according to claim 1, wherein the fourth lens group is moved along the optical axis upon varying a focus from an object at infinity to a close object.

5. The high zoom ratio zoom lens system according to claim 1, wherein the following conditional expressions are satisfied:

$$-0.15 < FG1/FL12 < 0.25$$

$$0.4 < FG1/(FL3 \times Nd3) < 0.6$$

where FL12 denotes a combined focal length of the negative meniscus lens and the first positive lens in the first lens group, and Nd3 denotes refractive index of the second positive lens in the first lens group at d-line (wavelength $\lambda$=587.6nm).

6. The high zoom ratio zoom lens system according to claim 1, wherein the following conditional expression is satisfied:

$$-0.0001 < Fw/(Ft \times FL12) < 0.0005 \quad \text{(unit: 1/mm)}$$

where Ft denotes a focal length of the zoom lens system in the telephoto end state, Fw denotes a focal length of the zoom lens system in the wide-angle end state, and FL12 denotes a combined focal length of the negative meniscus lens and the first positive lens in the first lens group.

7. The high zoom ratio zoom lens system according to claim 1, wherein the negative meniscus lens and the first positive lens are cemented with each other.

8. The high zoom ratio zoom lens system according to claim 1, wherein the zoom lens system has a half angle of view in the telephoto end state of 3.5 degrees or less.

9. A method for forming an image of an object and varying a focal length, comprising the steps of:
   providing a high zoom ratio zoom lens system that includes, in order from the object, a first lens group having positive refractive power, a second lens group, a third lens group, and a fourth lens group, the first lens group including, in order from the object, a negative meniscus lens having a convex surface facing the object, a first positive lens having a convex surface facing the object, and a second positive lens; and
   varying the focal length of the zoom lens system, including moving the first lens group and the second lens group along the optical axis when the zoom lens system moves from a wide-angle end state to a telephoto end state, wherein the following conditional expression is satisfied:

$$0.31 < FG1 \times (Nd1-Nd2)/FL3 < 0.75$$

where FG1 denotes a focal length of the first lens group, FL3 denotes a focal length of the second positive lens, Nd1 denotes refractive index of the negative meniscus lens at d-line (wavelength $\lambda$=587.6nm), and Nd2 denotes refractive index of the first positive lens at d-line (wavelength $\lambda$=587.6nm).

10. The method according to claim 9, wherein the second lens group has negative refractive power, the third lens group has positive refractive power, and the fourth lens group has positive refractive power.

11. The method according to claim 9, wherein the following conditional expressions are satisfied:

$$-0.15 < FG1/FL12 < 0.25$$

$$0.4 < FG1/(FL3 \times Nd3) < 0.6$$

where FL12 denotes a combined focal length of the negative meniscus lens and the first positive lens in the first lens group, and Nd3 denotes refractive index of the second positive lens in the first lens group at d-line (wavelength $\lambda$=587.6nm).

12. The method according to claim 9, wherein the following conditional expression is satisfied:

$$-0.0001 < Fw/(Ft \times FL12) 0.0005 \quad \text{(unit: 1/mm)}$$

where Ft denotes a focal length of the zoom lens system in the telephoto end state, Fw denotes a focal length of the zoom lens system in the wide-angle end state, and FL12 denotes a combined focal length of the negative meniscus lens and the first positive lens in the first lens group.

13. The method according to claim 9, wherein an aspherical surface is included in the second lens group, and an aspherical surface is included in the third lens group.

14. The method according to claim 9, wherein the fourth lens group is moved along the optical axis upon varying a focus from an object at infinity to a close object.

15. The method according to claim 9, wherein the negative meniscus lens and the first positive lens are cemented with each other.

16. The method according to claim 9, wherein a zoom ratio of the zoom lens system is about 10 or more.

17. A high zoom ratio zoom lens system having a zoom ratio of about 10 or more and comprising, in order from an object:

a first lens group having positive refractive power; and
a second lens group;
the first lens group including, in order from the object, a negative meniscus lens having a convex surface facing the object, a first positive lens having a convex surface facing the object, and a second positive lens,
the first lens group and the second lens group being moved along the optical axis upon zooming from a wide-angle end state to a telephoto end state, and
the following conditional expression being satisfied:

$$0.31 < FG1 \times (Nd1 - Nd2)/FL < 0.75$$

where FG1 denotes a focal length of the first lens group, FL3 denotes a focal length of the second positive lens, Nd1 denotes refractive index of the negative meniscus lens at d-line (wavelength λ=587.6nm), and Nd2 denotes refractive index of the first positive lens at d-line (wavelength λ=587.6nm).

18. The high zoom ratio zoom lens system according to claim 17, wherein the following conditional expressions are satisfied:

$$-0.15 < FG1/FL12 < 0.25$$

$$0.4 < FG1/(FL3 \times Nd3) < 0.6$$

where FL12 denotes a combined focal length of the negative meniscus lens and the first positive lens in the first lens group, and Nd3 denotes refractive index of the second positive lens in the first lens group at d-line (wavelength λ=587.6nm).

19. The high zoom ratio zoom lens system according to claim 17, further comprising, in order from the object, a third lens group disposed to an image side of the second lens group, and a fourth lens group, wherein the second lens group has negative refractive power, the third lens group has positive refractive power, and the fourth lens group has positive refractive power.

20. The high zoom ratio zoom lens system according to claim 19, wherein when zooming from the wide-angle end state to the telephoto end state, the first lens group is moved toward the object, the second lens group is moved along a zooming trajectory having a concave shape facing the object, the third lens group is moved toward the object, and the fourth lens group is moved along a zooming trajectory having a convex shape facing the object.

21. The high zoom ratio zoom lens system according to claim 19, wherein an aspherical surface is included in the second lens group, and an aspherical surface is included in the third lens group.

22. A high zoom ratio zoom lens system having a half angle of view in a telephoto end state of 3.5 degrees or less and comprising, in order from an object:

a first lens group having positive refractive power; and
a second lens group;
the first lens group including, in order from the object, a negative meniscus lens having a convex surface facing the object, a first positive lens having a convex surface facing the object, and a second positive lens,
the first lens group and the second lens group being moved along the optical axis upon zooming from a wide-angle end state to a telephoto end state, and the following conditional expression being satisfied:

$$0.31 < FG1 \times (Nd1 - Nd2)/FL3 < 0.75$$

where FG1 denotes a focal length of the first lens group, FL3 denotes a focal length of the second positive lens, Nd1 denotes refractive index of the negative meniscus lens at d-line (wavelength λ=587.6nm), and Nd2 denotes refractive index of the first positive lens at d-line (wavelength λ=587.6nm).

23. The high zoom ratio zoom lens system according to claim 22, wherein the following conditional expression is satisfied:

$$-0.0001 < Fw/(Ft \times FL12) < 0.0005 \quad \text{(unit: 1/mm)}$$

where Ft denotes a focal length of the zoom lens system in the telephoto end state, Fw denotes a focal length of the zoom lens system in the wide-angle end state, and FL12 denotes a combined focal length of the negative meniscus lens and the first positive lens in the first lens group.

24. The high zoom ratio zoom lens system according to claim 22, wherein the negative meniscus lens and the first positive lens are cemented with each other.

25. The high zoom ratio zoom lens system according to claim 22, further comprising, in order from the object, a third lens group disposed to an image side of the second lens group, and a fourth lens group, wherein the second lens group has negative refractive power, the third lens group has positive refractive power, and the fourth lens group has positive refractive power.

26. The high zoom ratio zoom lens system according to claim 25, wherein the fourth lens group is moved along the optical axis upon varying a focus from an object at infinity to a close object.

27. The high zoom ratio zoom lens system according to claim 25, wherein an image blur is corrected by moving the third lens group perpendicularly to the optical axis.

* * * * *